US009440533B2

(12) United States Patent
Maeda et al.

(10) Patent No.: US 9,440,533 B2
(45) Date of Patent: Sep. 13, 2016

(54) CONTROL APPARATUS FOR A VEHICULAR 4-WHEEL DRIVE SYSTEM

(71) Applicant: Toyota Jidosha Kabushiki Kaisha, Toyota-shi Aichi-ken (JP)

(72) Inventors: Yoshinori Maeda, Aichi-ken (JP); Takahiro Yoshimura, Toyota (JP); Ryota Horie, Nagoya (JP); Hiroshi Tamura, Toyota (JP); Hideki Tamoto, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/882,796

(22) Filed: Oct. 14, 2015

(65) Prior Publication Data
US 2016/0107523 A1   Apr. 21, 2016

(30) Foreign Application Priority Data

Oct. 16, 2014   (JP) .................................. 2014-212120

(51) Int. Cl.
*B60K 23/08* (2006.01)
*B60K 17/354* (2006.01)
*B60K 17/02* (2006.01)

(52) U.S. Cl.
CPC ............... *B60K 23/08* (2013.01); *B60K 17/02* (2013.01); *B60K 17/354* (2013.01)

(58) Field of Classification Search
CPC .......................... B60K 23/08; B60K 23/0808
See application file for complete search history.

(56) References Cited

U.S. PATENT DOCUMENTS

| 8,483,921 B2* | 7/2013 | Sakagami | B60K 23/00 180/247 |
| 9,254,746 B2* | 2/2016 | Yokoo | B60K 6/52 |
| 9,346,353 B2* | 5/2016 | Stares | B60K 17/34 |

FOREIGN PATENT DOCUMENTS

JP   2009-208633 A   9/2009

* cited by examiner

*Primary Examiner* — Kevin Hurley
(74) *Attorney, Agent, or Firm* — Dinsmore & Shohl LLP

(57) ABSTRACT

A control apparatus for a vehicular 4-wheel drive system provided with: primary drive wheels to which a drive force is transmitted from a drive power source; auxiliary drive wheels to which the drive force is selectively transmitted; a first clutch configured to selectively place a first power transmitting path in a power transmitting state and a power cutoff state; and a second clutch disposed in a second power transmitting path to selectively place the second power transmitting path in a power transmitting state and a power cutoff state. The first and second clutches are placed in fully released states to establish a 2-wheel drive mode. The control apparatus includes a first-clutch control portion configured to bring the first clutch into a partially engaged state when a predetermined condition in which the vehicular 4-wheel drive system generates or is considered to generate a noise is satisfied in the 2-wheel drive mode.

4 Claims, 8 Drawing Sheets

CONTROL APPARATUS FOR A VEHICULAR 4-WHEEL DRIVE SYSTEM

CROSS REFERENCE TO RELATED APPLICATION

The present application claims the priority from Japanese Patent Application No. 2014-212120 filed on Oct. 16, 2014, the disclosure of which is herein incorporated by reference in its entirety.

BACKGROUND OF THE INVENTION

1. Field of the Invention

The present invention relates generally to a control apparatus for a vehicular 4-wheel drive system, and more particularly to a control of a 4-wheel drive system of a vehicle provided with primary drive wheels and auxiliary drive wheels.

2. Description of Related Art

There is known a vehicular 4-wheel drive system provided with: primary drive wheels to which a drive force is transmitted from a drive power source; auxiliary drive wheels to which the drive force is selectively transmitted; a transfer device configured to distribute a torque from the drive power source to the primary drive wheels and the auxiliary drive wheels; and a coupling device configured to adjust the drive force to be transmitted to the auxiliary drive wheels. JP-2009-208633 A1 discloses an example of such a vehicular 4-wheel drive system, wherein an amount of torque to be transmitted through the coupling device is increased to a predetermined value in an engaged state of a lock-up clutch incorporated in a torque converter disposed between the drive power source and a power distributing mechanism, so that backlashes of gears provided in a power transmitting path from the coupling device to the auxiliary drive wheels are reduced to reduce a rattling noise generated due to abutting contacts of the gears upon variations of the torque transmitted through the power transmitting path.

By the way, there is proposed a vehicular 4-wheel drive system provided with a first clutch configured to selectively place a first power transmitting path between the above-indicated drive power source and the above-indicated auxiliary drive wheels, in a power transmitting state and a power cutoff state, and a second clutch disposed in a second power transmitting path between the first clutch and the auxiliary drive wheels, to selectively place the second power transmitting path in a power transmitting state and a power cutoff state. In a 2-wheel drive mode of this vehicular 4-wheel drive system in which the drive force is transmitted from the drive power source to the primary drive wheels, the first clutch and the second clutch are placed in released states, to prevent dragging rotary motions of rotary members disposed between the first clutch and the second clutch. Described more specifically, the second clutch takes the form of a coupling device disposed on an input side of a rear-wheel differential device, as disclosed in the above-identified publication JP-2009-208633 A1, a coupling device disposed in one of right and left rear-wheel drive axles, or a pair of coupling devices disposed in the respective right and left rear-wheel drive axles. The vehicular 4-wheel drive system may be provided with another coupling device in addition to the second clutch. In any one of the arrangements of the vehicular 4-wheel drive system described above, the torque to be transmitted through the coupling device is adjusted in an engaged state of the first clutch, to reduce the noise generated due to variation of a torque of the drive power source or a transmission, in the 2-wheel drive mode in which the first and second clutches are placed in the released states. Accordingly, the rotary members disposed between the first and second clutches are rotated at the same speeds as in the engaged state of the first clutch, resulting in deterioration of fuel economy of the vehicular 4-wheel drive system due to the rotary motions of those rotary members.

SUMMARY OF THE INVENTION

The present invention was made in view of the background art described above. It is therefore an object of the present invention to provide a control apparatus for a vehicular 4-wheel drive system provided with primary drive wheels to which a drive force is transmitted from a drive power source, auxiliary drive wheels to which the drive force is selectively transmitted, a first clutch configured to selectively place a first power transmitting path between the drive power source and the auxiliary drive wheels, in a power transmitting state and a power cutoff state, and a second clutch disposed in a second power transmitting path between the first clutch and the auxiliary drive wheels, to selectively place the second power transmitting path in a power transmitting state and a power cutoff state, the control apparatus permits reduction of a noise generated in a 2-wheel drive mode of the vehicular 4-wheel drive system, while reducing deterioration of fuel economy of the vehicular 4-wheel drive system.

The object indicated above is achieved according to the principle of the present invention, which provides a control apparatus for a vehicular 4-wheel drive system provided with: primary drive wheels to which a drive force is transmitted from a drive power source; auxiliary drive wheels to which the drive force is selectively transmitted; a first clutch configured to selectively place a first power transmitting path between the drive power source and the auxiliary drive wheels, in a power transmitting state and a power cutoff state, thus to adjust torque to be transmitted through the first clutch; and a second clutch disposed in a second power transmitting path between the first clutch and the auxiliary drive wheels, to selectively place the second power transmitting path in a power transmitting state and a power cutoff state, the control apparatus being configured to place the first clutch and said second clutch in fully released states in a 2-wheel drive mode of the vehicular 4-wheel drive system in which the drive force is transmitted from the drive power source to the primary drive wheels, the control apparatus comprising a first-clutch control portion configured to bring the first clutch into a partially engaged state when a predetermined condition in which the vehicular 4-wheel drive system generates or is considered to generate a noise is satisfied in the 2-wheel drive mode in which the first and second clutches are placed in the fully released states.

In the control apparatus according to the present invention described above, the first clutch is brought into the partially engaged or slipping state when the predetermined condition in which the vehicular 4-wheel drive system generates or is considered to generate the noise is satisfied in the 2-wheel drive mode in which the first and second clutches are placed in the fully released states. Accordingly, rotary members disposed between the first and second clutches are prevented from being rotated as established in a 4-wheel drive mode of the vehicular 4-wheel drive system, and backlashes existing in a spline-coupling portion and any other portion of a drive line of the vehicular 4-wheel drive system are eliminated. Thus, the present control apparatus permits reduction of the noise generated in the 2-wheel drive mode, while reducing deterioration of the fuel economy of the vehicular 4-wheel drive system.

In one preferred form of the invention, the first-clutch control portion places the first clutch in the partially engaged state while the second clutch is held in the fully released state. In this form of the invention, rotary motions of the auxiliary drive wheels are prevented from being transmitted toward the first clutch through the second clutch in the 2-wheel drive mode in which the second clutch is held in the fully released state while the first clutch is placed in the partially engaged state.

In another preferred form of the invention, the first-clutch control portion controls the partially engaged state of the first clutch on the basis of rotating speed of two rotary members disposed on respective opposite sides of the first clutch so as to prevent from a fully engaged state of the first clutch. In this form of the invention, the rotary member disposed between the first and second clutches is prevented from being rotated at a high speed as established in the fully engaged state of the first clutch, so that the deterioration of the fuel economy can be reduced.

In a further preferred form of the invention, the above-described predetermined condition is satisfied when at least one of the following conditions is satisfied: an operating speed of the drive power source falls within a predetermined range; a load of the drive power source is equal to or larger than a predetermined value; a transmission operatively connected to the drive power source is presently placed in any one of at least one predetermined high-gear shift position; and a lock-up clutch provided in a torque converter disposed between the drive power source and the transmission is placed in a fully engaged state or a partially engaged state. In this form of the invention, the first clutch is placed in the partially engaged state when the drive power source has a large amount of torque variation during its operation at a relatively low speed or under a relatively high load, or when the torque variation of the drive power source is likely to be transmitted through the drive line while the lock-up clutch is placed in the fully or partially engaged state, so that the generation of the noise due to the torque variation of the drive power source can be effectively reduced. Namely, the first clutch is not unnecessarily placed in the partially engaged state when the drive power source does not have a large amount of torque variation, so that the deterioration of the fuel economy of the vehicular 4-wheel drive system can be effectively reduced.

DETAILED DESCRIPTION OF PREFERRED EMBODIMENTS

Figure 1:
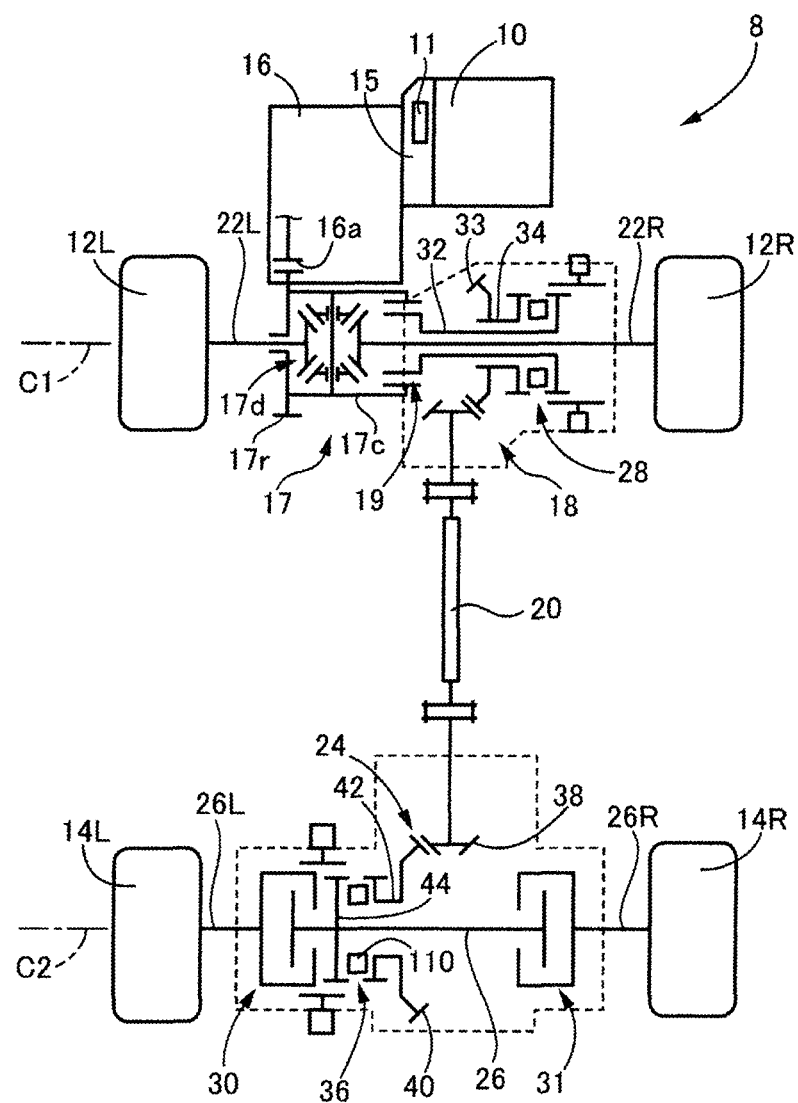
FIG. 1 is a schematic view showing an arrangement of one example of a vehicular 4-wheel drive system to which a control apparatus according to this invention is applicable.

Referring to the drawings, preferred embodiments of the present invention will be described in detail. It is to be understood that the drawings are simplified or transformed as needed, and do not necessarily accurately represent ratios of dimensions of various elements.

First Embodiment

Referring first to the schematic view of FIG. 1, there is shown an arrangement of one example of a vehicular 4-wheel drive system 8 (hereinafter referred to simply as "4-wheel drive system 8") to which a control apparatus according to the present invention is applicable. The 4-wheel drive system 8 is configured to drive a vehicle which is an FF type (front-engine front-drive type) vehicle in a 2-wheel drive mode. As shown in FIG. 1, the 4-wheel drive system 8 includes: a drive power source in the form of an engine 10; a first power transmitting path through which a drive force of the engine 10 is transmitted to left and right front wheels 12L and 12R (hereinafter collectively referred to as "front wheels 12", unless otherwise specified); a second power transmitting path through which the drive force of the engine 10 is selectively transmitted to left and right rear wheels 14L and 14R (hereinafter collectively referred to as "rear wheels 14", unless otherwise specified). The front wheels 12 are primary drive wheels driven by the drive force in both of the 2-wheel drive mode and a 4-wheel drive mode of the 4-wheel drive system 8, while the rear wheels 14 are auxiliary drive wheels not driven by the drive force in the 2-wheel drive mode and driven by the drive force in the 4-wheel drive mode.

The 4-wheel drive system 8 includes: a torque converter 15 provided with a lock-up clutch 11; an automatic transmission 16 (transmission); a front differential device 17; a transfer device 18 incorporating a first clutch 28; a propeller shaft 20; a bevel gear mechanism 24 functioning as a speed reducing device for reducing a rotating speed of the propeller shaft 20; a second clutch 36 disposed between the bevel gear mechanism 24 and rear-wheel drive axles 26, to selectively connect and disconnect the bevel gear mechanism 24 and the rear-wheel drive axles 26 to and from each other; a first coupling 30 disposed between the rear-wheel drive axles 26 and the left rear drive wheel 14L; and a second coupling 31 disposed between the rear-wheel drive axles 26 and the right rear drive wheel 14R.

The torque converter 15 is a fluid-operated power transmitting device configured to boost a torque of the engine 10 and transmit the boosted torque to the automatic transmission 16 through a working fluid. The lock-up clutch 11 provided in the torque converter 15 is configured to selectively connect a pump impeller and a turbine impeller (not shown) of the torque converter 15 to each other. In a fully engaged state of the lock-up clutch 11, the torque of the engine 10 is transmitted to the automatic transmission 16, not through the fluid, namely, directly to the automatic transmission 16 without boosting of the torque of the engine 10.

The automatic transmission 16 is disposed in a power transmitting path between the engine 10 and the front differential device 17. For instance, the automatic transmission 16 is a step-variable transmission provided with a plurality of planetary gear sets and a plurality of frictional coupling devices (clutches and brakes). Since the automatic transmission 16 is a device known in the art, an arrangement and an operation of the automatic transmission 16 will not be described in detail.

The front differential device 17 includes a casing 17c, and a differential mechanism 17d which is a bevel gear device well known in the art. The front differential device 17 is configured to transmit the drive force to left and right front-wheel drive axles 22L and 22R (hereinafter referred to as "front-wheel drive axles 22", unless otherwise specified) for the front wheels 12, while allowing a difference between rotating speeds of the front-wheel drive axles 22L and 22R, as needed. The casing 17c of the front differential device 17 has an integrally formed ring gear 17r, which functions as an input rotary member and is held in meshing engagement with an output rotary member of the automatic transmission 16 in the form of an output gear 16a, so that the drive force is transmitted from the automatic transmission 16 to the ring gear 17r. Since the front differential device 17 is a device known in the art, an arrangement and an operation of the front differential device 17 will not be described in detail.

The transfer device 18 is disposed in series with the front differential device 17 in an axial direction of the front-wheel drive axles 22. The transfer device 18 includes: an input rotary member 32 coupled through a spline-coupling portion 19 to the casing 17c of the front differential device 17 such that the input rotary member 32 is rotatable together with the casing 17c; an output rotary member 34 having a ring gear 33 formed thereon, from which the drive force is transmitted toward the rear wheels 14; and the above-indicated first clutch 28 configured to selectively connect and disconnect the input rotary member 32 and the output rotary member 34 to and from each other. These input rotary member 32, output rotary member 34 and first clutch 28 are disposed coaxially with the front-wheel drive axles 22 having an axis C1. An arrangement and an operation of the first clutch 28 will be described below.

The propeller shaft 20 is disposed between the bevel gear mechanism 24, and the output rotary member 34 functioning as an output shaft of the transfer device 18, to transmit the drive force from the transfer device 18 toward the rear wheels 14. The bevel gear mechanism 24 includes a drive pinion 38 connected to the propeller shaft 20, and a ring gear 40 held in meshing engagement with the drive pinion 38. This bevel gear mechanism 24 not only functions to change a direction of rotation center, but also functions as a speed reducing device for reducing a rotating speed of the propeller shaft 20 so that a rotary motion of the reduced speed is transmitted to the rear-wheel axles 26.

The second clutch 36 is configured to selectively connect and disconnect an input rotary member 42 and an output rotary member 44 of the bevel gear mechanism 24 to and from each other. The input rotary member 42 is connected to the ring gear 40 and is rotatable about an axis C2 of the rear-wheel drive axles 26, while the output rotary member 44 is connected to the rear-wheel drive axles 26 and is rotatable about the axis C2.

The first coupling 30 disposed between the rear-wheel drive axles 26 and the left rear wheel 14L is constituted by a multiple-disc clutch of a wet type, for example, and is configured such that a torque to be transmitted through the first coupling 30 is controllable. Similarly, the second coupling 31 disposed between the rear-wheel drive axles 26 and the right rear wheel 14R is constituted by a multiple-disc clutch of a wet type, for example, and is configured such that a torque to be transmitted through the second coupling 31 is controllable. Thus, the drive force (torque) transmitted to the left and right rear wheels 14 can be adequately distributed.

Figure 2:
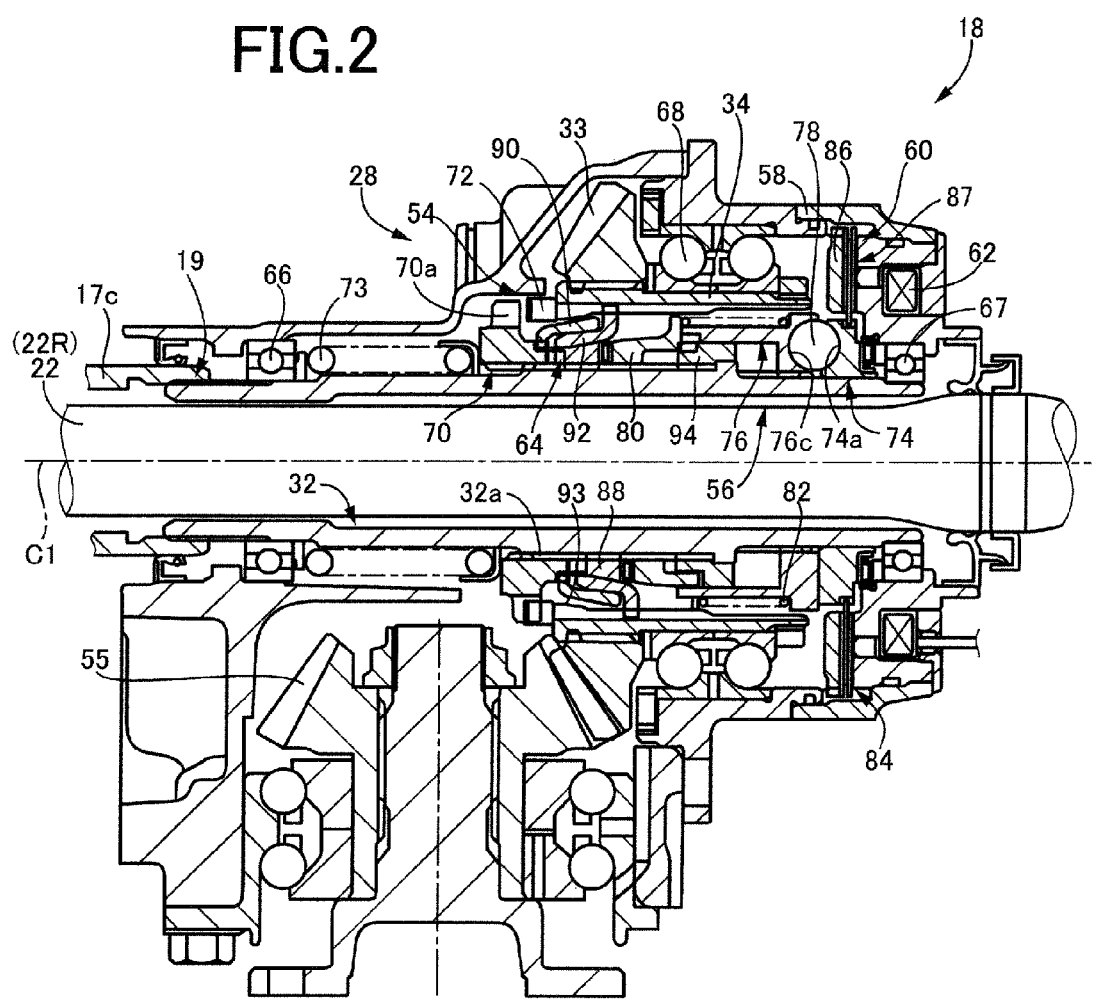
FIG. 2 is a cross sectional view showing an arrangement of a transfer device provided in the vehicular 4-wheel drive system of FIG. 1.

FIG. 2 is the cross sectional view showing an arrangement of the transfer device 18. The transfer device 18 is disposed coaxially with the front-wheel drive axles 22 (drive axle 22R) rotatable about the axis C1, between the casing 17c of the front differential device 17 and a driven pinion 55 connected to the propeller shaft 20, and is configured to transmit a portion of the drive force generated by the engine 10, to the rear wheels (auxiliary drive wheels) 14.

The transfer device 18 includes: the cylindrical input rotary member 32 spline-coupled to the casing 17c of the front differential device 17; the cylindrical output rotary member 34 having the ring gear 33 which is held in meshing engagement with the driven pinion 55; a first clutch mechanism 54 in the form of a positive or claw clutch (dog clutch) configured to selectively connect and disconnect the input rotary member 32 and the output rotary member 34 to and from each other; a first thrust force boosting mechanism 56 configured to generate a thrust force for selectively placing the first clutch mechanism 54 in an engaged state and a released state; a first control clutch 60 disposed between a first cam 74 and a stationary member in the form of a transfer casing 58 of the first thrust force boosting mechanism 56, to control a torque to be transmitted between those first cam 74 and transfer casing 58; a first solenoid coil 62 provided to control a force of an engaging action of the first control clutch 60; and a first synchronizing mechanism 64 disposed between the first clutch mechanism 54 and the first thrust force boosting mechanism 56 in the axial direction of the front-wheel drive axles 22. The members of the transfer device 18 described above are all disposed coaxially with the front-wheel drive axles 22 rotatable about the axis C1. The first clutch 28 includes the first clutch mechanism 54, the first thrust force boosting mechanism 56, the first control clutch 60, the first solenoid coil 62, the first synchronizing mechanism 64, a first holder 94, and a spring 73.

The input rotary member 32 is disposed radially outwardly of the front-wheel drive axles 22, and supported such that the input rotary member 32 is rotatable about the axis C1 of the front-wheel drive axles 22. Described more specifically, ball bearings 66 and 67 are fitted on respective axially opposite end portions of the input rotary member 32, so that the input rotary member 32 is rotatably supported by the transfer casing 58 via those ball bearings 66 and 67. Further, the axial end portion (left end portion) of the input rotary member 32 on the side of the front differential device 17 is coupled through the spline-coupling portion 19 to the casing 17c of the front differential device 17, so that the input rotary member 32 is rotated together with the front differential device 17 about the axis C1, through the spline-coupling portion 19.

The output rotary member 34 is disposed radially outwardly of the input rotary member 32, and supported such that the output rotary member 34 is rotatable about the axis C1. Described more specifically, the output rotary member 34 is rotatably supported by a double-row angular contact ball bearing 68, in a cantilever fashion. The ring gear 33 meshing with the driven pinion 55 is fixedly provided on the axial end portion of the output rotary member 34 on the side of the front differential device 17, such that the ring gear 33 is rotatable together with the output rotary member 34.

The first clutch mechanism 54 is disposed between the input rotary member 32 and the output rotary member 34, and is configured to selectively connect and disconnect these input and output rotary members 32 and 34 to and from each other. The first clutch mechanism 54 includes: an annular movable sleeve 70 which is rotatable together with and axially movable relative to the input rotary member 32, and which has external meshing teeth 70a formed on its outer circumferential surface; and meshing teeth 72 formed on the axial end portion of the output rotary member 34 on the side of the front differential device 17. The movable sleeve 70 is spline-coupled on its inner circumferential surface to external meshing teeth 32a formed on the input rotary member 32, so that the movable sleeve 70 is rotatable together with the input rotary member 32 and axially movable relative to the input rotary member 32.

An upper part of FIG. 2 with respect to the axis C1 shows the external meshing teeth 70a and the meshing teeth 72 which are not held in meshing engagement with each other, namely, shows the first clutch mechanism 54 placed in its released state. In this state, the input rotary member 32 and the output rotary member 34 are disconnected from each other, so that the drive force generated by the engine 10 is not transmitted to the output rotary member 34. On the other hand, a lower part of FIG. 2 with respect to the axis C1 shows the external meshing teeth 70a and the meshing teeth 72 which are held in meshing engagement with each other, namely, shows the first clutch mechanism 54 placed in its engaged state. In this state, the drive force generated by the engine 10 is transmitted to the output rotary member 34, that is, the drive force is transmitted to the rear wheels 14.

Further, the spring 73 is interposed between the ball bearing 66 and the movable sleeve 70 in the axial direction of the front-wheel drive axles 22. This spring 73 biases the movable sleeve 70 in the axial direction toward the ball bearing 67 (away from the front differential device 17), namely, in the axial direction which permits the external meshing teeth 70a and the meshing teeth 72 to be brought into meshing engagement with each other.

The first thrust force boosting mechanism 56 is constituted by a positive or claw clutch (dog clutch) disposed between the input rotary member 32 and the output rotary member 34 in the axial direction of the front-wheel drive axles 22. The first thrust force boosting mechanism 56 includes: the first cam 74; a second cam 76 movable in the axial direction of the front-wheel drive axles 22; a ball cam 78 interposed between the first cam 74 and the second cam 76 in the axial direction of the front-wheel drive axles 22; a piston 80 abuttable onto the second cam 76 and axially movable together with the second cam 76; and a spring 82 biasing the second cam 76 in its axial direction toward the first cam 74 (toward the ball bearing 67).

The first cam 74 is an annular member having an inner circumferential surface slidably fitted on an outer circumferential surface of the input rotary member 32, and an outer circumferential surface to which one or more inner clutch plates of the first control clutch 60 are spline-coupled such that the inner clutch plates are rotatable together with the first cam 74. The second cam 76 is an annular member spline-fitted on an outer circumferential surface of the input rotary member 32 such that the second cam 76 is rotatable together with and axially movable relative to the input rotary member 32. The second cam 76 has a protrusion extending from one of its opposite axial end portions toward the first clutch mechanism 54 such that the protrusion is held in abutment at its axial end face with the piston 80.

The first cam 74 and the second cam 76 have mutually opposed concave surfaces serving as respective first and second cam surfaces 74a and 76c, and the ball cam 78 is interposed between and held in contact with the first and second cam surfaces 74a and 76c. Rotary motions of the first and second cams 74 and 76 relative to each other cause the ball cam 78 to force the first and second cam surfaces 74a and 76c of the first and second cams 74 and 76 in opposite axial directions, so that the first and second cams 74 and 76 are axially moved away from each other. At the same time, since an axial end of the piston 80 is in abutting contact with the axial end face on the front differential device 17 of the second cam 76, the axial motion of the second cam 76 toward the front differential device 17 causes to be axially moved toward the front differential device 17. The piston 80 is disposed between the second cam 76 and first holder 94 and the first synchronizing mechanism 64, in its axial direction, and is rotatable and axially movable relative to the input rotary member 32.

The first control clutch 60 is disposed radially outwardly of the first thrust force boosting mechanism 56 (first cam 74), and is configured to be selectively placed in a fully engaged state for fixing or connecting the first cam 74 of the first thrust force boosting mechanism 56 to the stationary member in the form of the transfer casing 58, and a fully released state for disconnecting the first cam 74 from the transfer casing 58. The first control clutch 60 includes: the above-indicated inner clutch plates in the form of discs spline-coupled at its inner circumference to the outer circumferential surface of the first cam 74 such that the inner clutch plates are rotatable together with and axially movable relative to the first cam 74; one or more outer clutch plates in the form of discs which are disposed on the respective opposite sides of the inner clutch plates and which are spline-coupled at their outer circumference to the transfer casing 58 such that the outer clutch plates are rotatable together with and axially movable relative to the transfer casing 58; and an armature 86 which is spline-coupled at its outer circumference to the transfer casing 58, like the outer clutch plates, such that the armature 86 is rotatable together with and axially movable relative to the transfer casing 58. The inner clutch plates and the outer clutch plates serve as frictional coupling elements 84 of the first control clutch 60.

The first solenoid coil 62 is disposed such that the first solenoid coil 62 overlaps the frictional coupling elements 84 of the first control clutch 60 and the armature 86, as seen in the axial direction of the front-wheel drive axles 22. When an electric current is applied to the first solenoid coil 62, a magnetic flux is generated around the first solenoid coil 62, so that the armature 86 is attracted toward the first solenoid coil 62, whereby the frictional coupling elements 84 are forced onto each other, so that a torque is transmitted through the first control clutch 60. An electromagnetic attraction force generated by the armature 86 increases with an increase of the amount of electric current applied to the first solenoid coil 62. When the amount of electric current applied to the first solenoid coil 62 exceeds a predetermined threshold value, the first cam 74 of the first thrust force boosting mechanism 56 is fully fixed to the transfer casing 58.

When a rotary motion of the first cam 74 of the first thrust force boosting mechanism 56 is stopped, or when a speed of the rotary motion is lowered, the second cam 76 rotated together with the input rotary member 32 is rotated relative to the first cam 74, so that the first and second cams 74 and 76 rotated relative to each other are axially moved away from each other by the ball cam 78. In this respect, it is noted that the first cam 74 is held in abutting contact with the transfer casing 58 through a thrust bearing, and is thus prevented from being axially moved, so that the second cam 76 is moved toward the front differential device 17 in the axial direction of the front-wheel drive axles 22, while at the same time the piston 80 held in abutting contact with the second cam 76 is axially moved toward the front differential device 17.

The first synchronizing mechanism 64 is disposed between the piston 80 and the movable sleeve 70 in the axial direction of the front-wheel drive axles 22, for synchronization of the rotary motions of the input and output rotary members 32 and 34 with respect to each other. Namely, the first synchronizing mechanism 64 functions as a synchronizing device for the input and output rotary members 32 and 34 when the first clutch mechanism 54 is placed in the engaged state. The first synchronizing mechanism 64 includes: a synchronizer ring 88; a frictional coupling member 90 spline-coupled to the movable sleeve 70 such that the frictional coupling member 90 is rotatable together with and axially movable relative to the movable sleeve 70; a frictional coupling member 92 spline-coupled to the output rotary member 34 such that the frictional coupling member 92 is rotatable together with and axially movable relative to the output rotary member 34; and a tapered portion 93 formed on an inner circumferential surface of the output rotary member 34 such that the tapered portion 93 is slidably fitted on an outer circumferential surface of the frictional coupling member 90.

The synchronizer ring 88 is an annular member spline-coupled at its inner circumference to the input rotary member 32 such that the synchronizer ring 88 is rotatable together with and axially movable relative to the input rotary member 32. The frictional coupling member 90 is a conical member spline-coupled at its inner circumference to the movable sleeve 70. The frictional coupling member 90 has a tapered outer circumferential surface slidably fitted on the tapered portion 93 formed on the inner circumferential surface of the output rotary member 34, and a tapered inner circumferential surface of the frictional coupling member 90 slidably fitted on a tapered outer circumferential surface of the frictional coupling member 92. The synchronizer ring 88 has a tapered outer circumferential surface slidably fitted on a tapered inner circumferential surface of the frictional coupling member 92. Between the synchronizer ring 88 and the piston 80, there is interposed a thrust bearing for receiving an axial thrust load.

In the first synchronizing mechanism 64 constructed as described above, an axial motion of the synchronizer ring 88 by the piston 80 toward the movable sleeve 70 causes generation of friction forces between the sliding surfaces of the synchronizer ring 88 and the frictional coupling member 92, between the sliding surfaces of the frictional coupling member 90 and the frictional coupling member 92, and between the sliding surfaces of the output rotary member 34 and the frictional coupling member 90. These friction forces permit synchronous rotary motions of the input and output rotary members 32 and 34, and consequent mutual meshing engagement of the external meshing teeth 70a and the meshing teeth 72, which form the first clutch mechanism 54, during running of the vehicle.

Between the piston 80 and the first thrust force boosting mechanism 56 in the axial direction of the front-wheel drive axles 22, there is disposed the first holder 94 which functions as a locking mechanism (retainer mechanism) for holding an operating state of the first clutch mechanism 54. The first holder 94 is an annular member which is rotatable together with and axially immovable relative to the input rotary member 32. The first holder 94 has retainer teeth 94a and 94b (shown in FIG. 3) formed on its outer circumferential surface, for retaining the piston 80.

Figure 3:
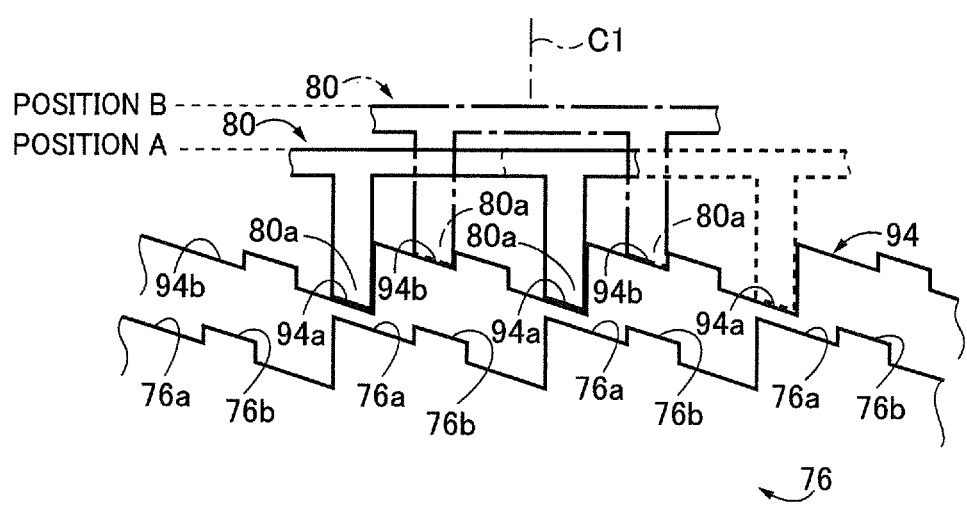
FIG. 3 is an illustrative view for explaining an operation of a first holder shown in FIG. 2 to retain a piston, the view showing a second cam, the piston and the first holder as exploded in their circumferential direction.

FIG. 3 is the illustrative view for explaining an operation of the first holder 94 to lock the piston 80, the view showing the second cam 76, the piston 80 and the first holder 94 as exploded in their circumferential direction. In the view of FIG. 3, a vertical direction corresponds to the axial direction of the front-wheel drive axles 22, while a horizontal direction corresponds to the circumferential direction (rotating direction) of the front-wheel drive axles 22. The piston 80 is axially biased by the spring 73 (shown in FIG. 2 but not shown in FIG. 3) toward the second cam 76 (in the downward direction as seen in FIG. 3).

The above-indicated retainer teeth 94a and 94b for retaining the piston 80 are formed on an axial portion of the circumferential surface of the first holder 94 on the side of the front differential device 17, at a predetermined interval in the circumferential direction of the first holder 94. These retainer teeth 94a and 94b are located at respective different axial positions of the first holder 94. Further, the piston 80 has projections 80a formed at a predetermined pitch in the circumferential direction, such that the projections 80a are engageable with the retainer teeth 94a and 94b. Further, the second cam 76 has abutment teeth 76a and 76b formed at a predetermined interval in the circumferential direction on axial end portion of the second cam 76, such that the abutment teeth 76a and 76b are abuttable onto the projections 80a of the piston 80. These abutment teeth 76a and 76b are located at respective different axial positions of the second cam 76. It is noted that since the second cam 76 and the first holder 94 are rotated together with the input rotary member 32, the circumferential positions of the abutment teeth 76a and 76b of the second cam 76 and the retainer teeth 94a and 94b of the first holder 94 relative to the input rotary member 32 are kept unchanged.

In a position A of the piston 80 indicated by a solid line in FIG. 3, the projections 80a are held in engagement with the retainer teeth 94a of the first holder 94. This position A corresponds to the lower part of FIG. 2 with respect to the axis C1, which shows that the external meshing teeth 70a and the meshing teeth 72 are held in meshing engagement with each other, namely, the input rotary member 32 and the output rotary member 34 are connected to each other by the firs clutch 28 (first clutch mechanism 54).

When one axial reciprocating motion of the second cam 76 is implemented by the first thrust force boosting mechanism 56, the projections 80a are raised by the abutment teeth 76a. During this axial reciprocating motion, the piston 80 is axially moved against a biasing action of the spring 73, so that the projections 80a move over the retainer teeth 94a toward the retainer teeth 94b, slide on slant surfaces of the retainer teeth 94b, and are eventually brought into meshing engagement with the retainer teeth 94b when the piston 80 reaches a position B indicated by a one-dot chain line in FIG. 3. Thus, the piston 80 is moved in the axial direction of the front-wheel drive axles 22 toward the front differential device 17, until the piston reaches the position B which corresponds to the upper part of FIG. 2 with respect to the axis C1, which shows that the external meshing teeth 70a and the meshing teeth 72 in the first clutch mechanism 54 are released from meshing engagement with each other, namely, the first clutch 28 is placed in the released state in which the input rotary member 32 and the output rotary member 34 are disconnected from each other.

When another axial reciprocating motion of the second cam 76 is implemented after the piston 80 is once located at the position B, the projections 80a are raised by the abutment teeth 76b of the second cam 76. During this axial reciprocating motion, the piston 80 is axially moved against the biasing action of the spring 73, so that the projections 80a move over the retainer teeth 94b toward the retainer teeth 94a, slide on slant surfaces of the retainer teeth 94a, and are eventually brought into engagement with the retainer teeth 94a when the piston 80 reaches the position A indicated by a broken line in FIG. 3. Thus, each time one axial reciprocating motion of the second cam 76 takes place, the piston 80 is located alternately at the position A in which the first clutch 28 (first clutch mechanism 54) is placed in the engaged state by the first holder 94, and at the position B in which the first clutch 28 (first clutch mechanism 54) is placed in the released state by the first holder 94. While the second cam 76 is held stationary, the piston 80 is mechanically held by the first holder 94 at the position A or B.

In the transfer device 18 constructed as described above, energization of the first solenoid coil 62 with an amount of electric current not smaller than the predetermined threshold value while the first clutch 28 is placed in the released state as shown in the upper part of FIG. 2 with respect to the axis C1 causes the first thrust force boosting mechanism 56 to be operated to move the second cam 76 in the axial direction, so that the first synchronizing mechanism 64 is operated to permit synchronous rotary motions of the input rotary member 32 and the output rotary member 34. De-energization of the first solenoid coil 62 in this state causes motions of the movable sleeve 70, first synchronizing mechanism 64 and piston 80 in the axial direction of the front-wheel drive axles 22 toward the ball bearing 67, under the biasing action of the spring 73, so that the piston 80 is held by the first holder 94 at the position A indicated in FIG. 3. At this position A, the external meshing teeth 70a and the meshing teeth 72 are held in meshing engagement with each other, and the first clutch 28 (first clutch mechanism 54) is placed in the engaged state, as shown in the lower part of FIG. 2 with respect to the axis C1. At the same time, the second cam 76 is moved in the axial direction of the front-wheel drive axles 22 toward the ball bearing 67, under the biasing action of the spring 82. Thus, one axial reciprocating motion of the second cam 76 causes the first clutch 28 to be placed in the engaged state, and mechanically held by the first holder 94 in the engaged state.

On the other hand, energization of the first solenoid coil 62 with the amount of electric current not smaller than the predetermined threshold value while the first clutch 28 is placed in the engaged state as shown in the lower part of FIG. 2 with respect to the axis C1 causes the first thrust force boosting mechanism 56 to be operated to move the piston 80 in the axial direction. In the engaged state of the first clutch 28, the first synchronizing mechanism 64 is not operated, but is moved by the piston 80 in the axial direction of the front-wheel drive axles 22 toward the ball bearing 66 (front differential device 17), so that the movable sleeve 70 held in abutting contact with the synchronizer ring 88 of the first synchronizing mechanism 64 is also moved in the axial direction of the front-wheel drive axles 22 toward the ball bearing 66, whereby the meshing engagement between the external meshing teeth 70a and the meshing teeth 72 is released. De-energization of the first solenoid coil 62 in this state causes the movable sleeve 70, first synchronizing mechanism 64 and piston 80 to be held at the position B indicated in FIG. 3 by the first holder 94, under the biasing force of the spring 73. At this position B, the external meshing teeth 70a and the meshing teeth 72 are held disengaged from each other, and the first clutch 28 is held in the released state, as shown in the upper part of FIG. 2 with respect to the axis C1.

As described above, the first clutch 28 is alternately placed in the engaged state and the released state each time one axial reciprocating motion of the second cam 76 of the first thrust force boosting mechanism 56 is implemented by energization of the first solenoid coil 62 with the amount of electric current not smaller than the predetermined threshold value. The first clutch 28 is mechanically held by the first holder 94 in the engaged or released state even after the first solenoid coil 62 is de-energized.

The second clutch 36 has an arrangement similar to that of the first clutch 28 of the transfer device 18 shown in FIG. 2. That is, the second clutch 36 includes a second thrust force boosting mechanism, a second control clutch, a second clutch mechanism and a second holder (which are not shown), and a second solenoid coil 110 (shown in FIGS. 1 and 4). The second clutch mechanism is alternately placed in engaged and released states each time one axial reciprocating motion of the second cam of the second thrust force boosting mechanism is implemented with an engaging action of the second control clutch by energization of the second solenoid coil 110 with an amount of electric current not smaller than a predetermined threshold value. The second clutch is mechanically held by the second holder in the engaged or released state even after the second solenoid coil 110 is de-energized.

When the 4-wheel drive system 8 constructed as described above is placed in a predetermined operating state in a 2-wheel drive mode, the first clutch 28 and the second clutch 36 are brought into their released states to reduce dragging rotary motions of rotary members (such as the propeller shaft 20) disposed in a power transmitting path between the first and second clutches 28 and 36, for improving fuel economy of the 4-wheel drive system 8. The 4-wheel drive system 8 is determined to be placed in the predetermined operating state when the vehicle is placed in a steady running state. For example, the determination as to whether the vehicle is placed in the steady running state is made depending upon whether a rate of change of a running speed V of the vehicle is kept lower than a predetermined threshold value for a predetermined length of time or more, and whether a rate of change of a steering angle of the vehicle is kept lower than a predetermined threshold value for a predetermined length of time or more.

By the way, a noise (so-called "rattling noise") is generated due to successive mutual abutting contacts of spline teeth of the spline-coupling portion 19 (shown in FIG. 2), for instance, while a large amount of variation of the torque (variation of the rotary motion speed) of the engine 10 is transmitted to a drive line (automatic transmission 16, transfer device 18, etc.) in the above-indicated 2-wheel drive mode. Although the generation of this noise can be reduced by placing the first clutch 28 in the engaged state to eliminate backlashes existing in the spline-coupling portion 19, the fuel economy of the 4-wheel drive system 8 is deteriorated due to dragging rotary motions of the propeller shaft 20, etc. In view of this phenomenon, a control apparatus in the form of an electronic control device 100 according to the present embodiment is configured to implement a control described below, for reducing the generation of the noise while reducing the deterioration of the fuel economy.

In this respect, it is noted that the propeller shaft 20 corresponds to a rotary element disposed between the first and second clutches.

Figure 4:
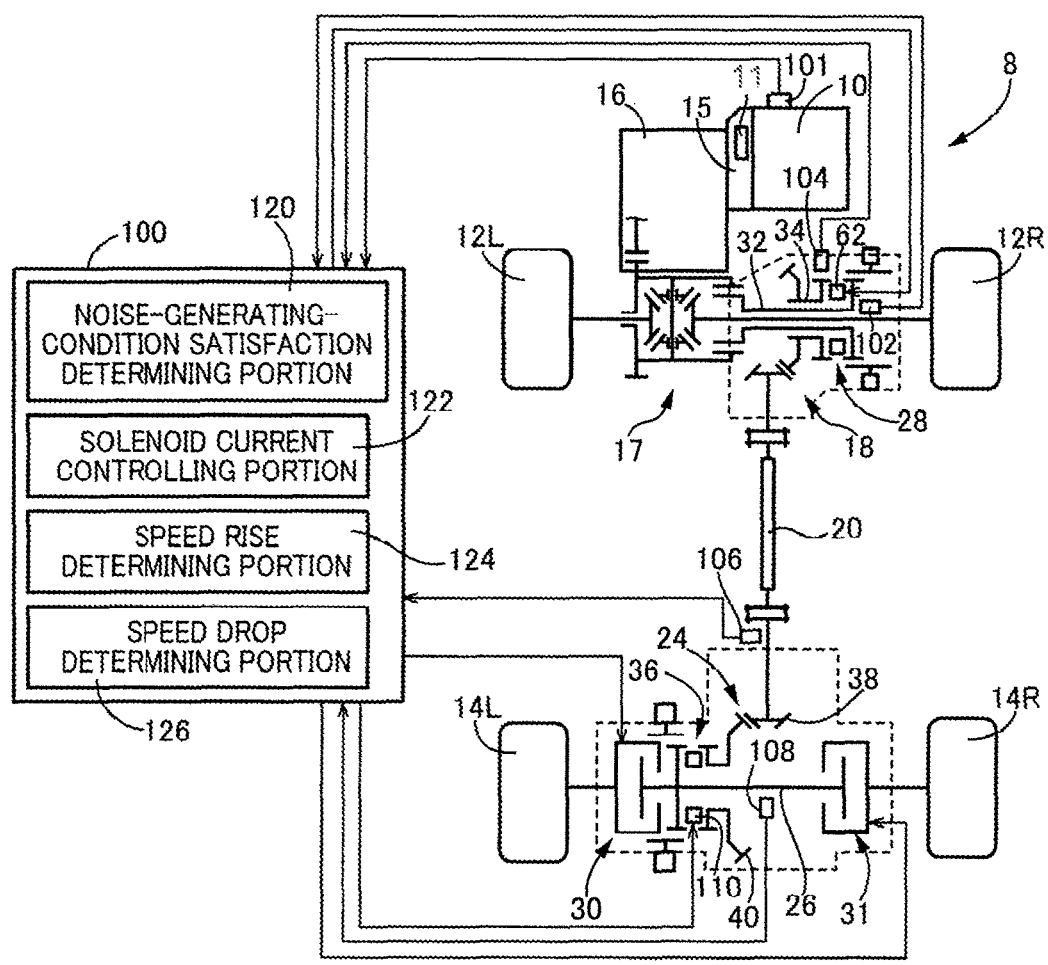
FIG. 4 is a functional block diagram illustrating inputs and outputs to and from an electronic control device provided to control the 4-wheel drive system of FIG. 1, and control functions of the electronic control device.

FIG. 4 is the functional block diagram illustrating inputs and outputs to and from the electronic control device 100 provided to control the 4-wheel drive system 8, and control functions of the electronic control device 100. The electronic control device 100 is configured to reduce the generation of the noise while reducing the deterioration of the fuel economy of the 4-wheel drive system 8 in the 2-wheel drive mode.

The electronic control device 100 receives input signals such as: an output signal of an engine speed sensor 101 indicative of an operating speed Ne of the engine 10 (engine speed Ne); an output signal of a first speed sensor 102 indicative of a rotating speed Nin of the input rotary member 32; an output signal of a second speed sensor 104 indicative of a rotating speed Nout of the output rotary member 34; an output signal of a third speed sensor 106 indicative of a rotating speed of the drive pinion 38 (namely, a rotating speed Np of the propeller shaft 20 to which the drive pinion 38 is connected); an output signal of a fourth speed sensor 108 indicative of a rotating speed Nr of the rear-wheel drive axles 26; an output signal of an accelerator pedal operation amount sensor (not shown) indicative of an operation amount Acc of an accelerator pedal; an output signal of a throttle valve opening angle sensor (not shown) indicative of an opening angle θth of a throttle valve; and an output signal of a steering angle sensor (not shown) indicative of an operating angle θ of a steering wheel. Further, the electronic control device 100 generates output signals such as: a drive signal to be applied to the first solenoid coil 62 to control the first clutch 28 (first control clutch 60); a drive signal to be applied to the second solenoid coil 110 to control the second clutch 36 (second control clutch); a drive signal to be applied to a linear solenoid coil (not shown) to control the torque to be transmitted through the first coupling 30; and a drive signal to be applied to a linear solenoid coil (not shown) to control the torque to be transmitted through the second coupling 31.

The electronic control device 100 includes a noise-generating-condition satisfaction determining portion 120, a solenoid current controlling portion 122, a speed rise determining portion 124, and a speed drop determining portion 126.

The noise-generating-condition satisfaction determining portion 120 is configured to determine whether a predetermined condition in which the 4-wheel drive system 8 generates or is considered to generate a noise is satisfied in the 2-wheel drive mode. For example, the noise-generating-condition satisfaction determining portion 120 determines that the predetermined condition in which the 4-wheel drive system 8 generates or is considered to generate a noise is satisfied, when the engine speed Ne falls within a predetermined noise generating range (NE_THD≤Ne≤NE_THU) in which a noise is generated in the 4-wheel drive system 8. The value NE_THD is a lower limit of the predetermined noise generating range, while the value NE_THU is an upper limit of the predetermined noise generating range. These lower and upper limits NE_THD and NE_THU are obtained by experimentation as threshold values such that the 4-wheel drive system 8 generates a noise when the engine speed Ne falls within the range between these upper and lower threshold values.

The predetermined condition in which the 4-wheel drive system 8 generates or is considered to generate a noise may be set on the basis of a parameter other than the engine speed Ne, for instance, on the basis of: a torque Te (load) of the engine 10 obtained from the engine speed Ne and the accelerator pedal operation amount Acc; a presently established shift position of the automatic transmission 16; or an operating state of the lock-up clutch 11. Described more specifically, the noise-generating-condition satisfaction determining portion 120 determines that the predetermined condition in which the 4-wheel drive system 8 generates or is considered to generate a noise is satisfied, when the torque or load of the engine 10 is equal to or larger than a predetermined value, when the automatic transmission 16 is presently placed in any one of at least one predetermined high-gear shift position, or when the lock-up clutch 11 is placed in a fully engaged state or a partially engaged state. Alternatively, the noise-generating-condition satisfaction determining portion 120 determines that the predetermined condition is satisfied when at least one of the above-indicated conditions is satisfied, for example, when the engine speed Ne falls within the above-indicated noise generating range while the lock-up clutch 11 is placed in the fully or partially engaged state. The predetermined condition may be set as needed depending upon the particular specifications of the 4-wheel drive system 8.

The solenoid current controlling portion 122, which functions as a first-clutch control portion, is configured to control an amount of electric current Ic to be applied to the first solenoid coil 62, for bringing the first control clutch 60 into a partially engaged state (slipping) when the noise-generating-condition satisfaction determining portion 120 has determined that the predetermined condition in which the 4-wheel drive system 8 generates or is considered to generate a noise is satisfied. When the first control clutch 60 is brought into the partially engaged or slipping state, the first synchronizing mechanism 64 is operated to place the first clutch 28 in a partially engaged or slipping state so that backlashes existing in the spline-coupling portion 19 are eliminated. The elimination of the backlashes reduces the amount of generation of the noise due to mutual abutting contact of the spline teeth of the spline-coupling portion 19. In this respect, it is noted that while a torque to be transmitted through the first clutch mechanism 54 of the first clutch 28 which is a positive or claw clutch is not controllable by the first clutch mechanism 54, the operation of the first synchronizing mechanism 64 permits transmission of a torque due to friction. Thus, the first clutch 28 can be brought into a partially engaged or slipping state in which a torque is transmitted through the first synchronizing mechanism 64.

When a small amount of electric current Ic smaller than a predetermined upper limit is applied to the first solenoid coil 62, the first control clutch 60 is placed in a partially engaged or slipping state, so that the first synchronizing mechanism 64 is operated to eliminate the backlashes in the spline-coupling portion 19. To eliminate the backlashes, therefore, the solenoid current controlling portion 122 is configured to initially apply a predetermined small amount of electric current Ica to the first solenoid coil 62, to bring the first control clutch 60 into the partially engaged or slipping state. This predetermined small amount of electric current Ica is obtained by experimentation such that the first control clutch 60 is brought into the partially engaged or slipping state to permit an operation of the first synchronizing mechanism 64. In this state, the second clutch 36 is held in the fully released state, to prevent rotary motions of the rear wheels 14 from being transmitted to the propeller shaft 20 through the second clutch 36.

The speed rise determining portion 124, which also functions as the first-clutch control portion, is configured to determine whether the rotating speed Np of the propeller shaft 20 has been raised to a predetermined threshold value NP_THU or larger (Np≥NP_THU) during energization of the first solenoid coil 62 under the control of the solenoid current controlling portion 122. This predetermined threshold value NP_THU is set to be a relatively low value below which substantially no deterioration of the fuel economy of the 4-wheel drive system 8 due to a dragging rotary motion of the propeller shaft 20 takes place.

When the speed rise determining portion 124 has determined that the rotating speed Np of the propeller shaft 20 has been raised to the predetermined threshold value NP_THU or larger, the solenoid current controlling portion 122 adjusts the small amount of electric current Ic to be applied to the first solenoid coil 62, so that the rotating speed Np of the propeller shaft 20 is lowered. A value Ic' to which the small amount of electric current Ic is adjusted is feedback-controlled according to the following Equation (1), wherein Kp, Ki and e respectively represent a proportional gain, an integral gain, and a propeller shaft speed error (0−Np) wherein a target value of the rotating speed Np of the propeller shaft 20 is zero. By the feedback control of the small amount of electric current Ic (Ic'), the rotating speed Np of the propeller shaft 20 is lowered.

$$Ic'=Ic+(Kp \times e+Ki \times \int edt) \quad (1)$$

The speed drop determining portion 126, which also functions as the first-clutch control portion, is configured to determine whether the rotating speed Np of the propeller shaft 20 has been lowered to a predetermined threshold value NP_THD or lower, as a result of the feedback control of the small amount of electric current Ic by the solenoid current controlling portion 122. The predetermined threshold value NP_THD is set to be a very small value close to a lower limit of detection of the rotating speed Np by the third speed sensor 106, above which the feedback control can be implemented.

When the speed drop determining portion 126 has determined that the rotating speed Np has been dropped to the predetermined threshold value NP_THD or lower, the solenoid current controlling portion 122 holds the small amount of electric current Ic at a present value for a predetermined length of time TH, and then resets the small amount of electric current Ic to the initial value Ica.

Figure 5:
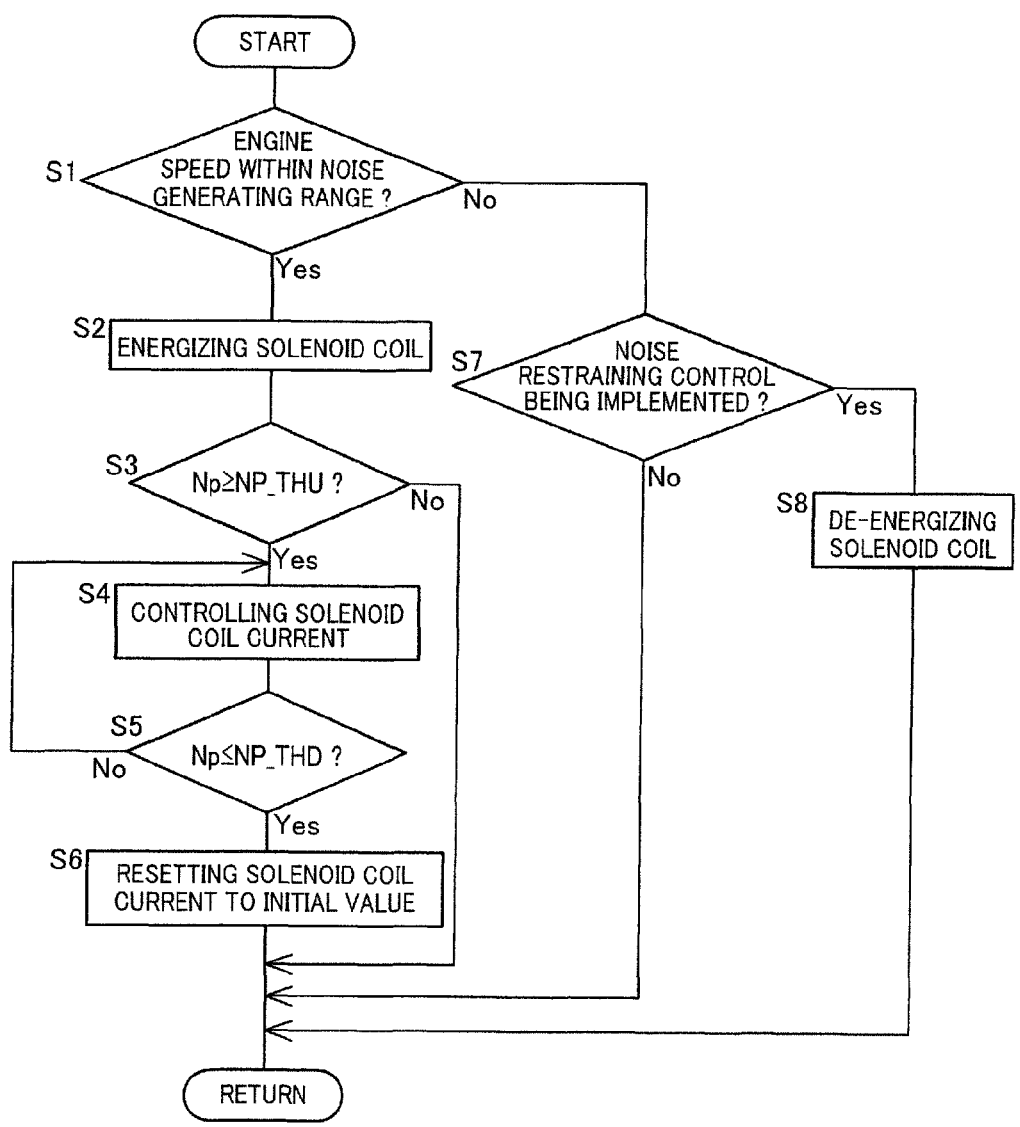
FIG. 5 is a flow chart illustrating a major control operation of the electronic control device of FIG. 4, namely, a control operation to reduce a noise generated in a 2-wheel drive mode of the 4-wheel drive system, without deterioration of fuel economy of the drive system.

FIG. 5 is the flow chart illustrating a major control operation of the electronic control device 100, namely, a control operation to reduce the noise generated in the 2-wheel drive mode (in the fully released states of the first and second clutches 28 and 36), without deterioration of the fuel economy of the 4-wheel drive system 8. This control operation is repeatedly performed while the engine 10 is in operation.

The control operation is initiated with a step S1 corresponding to the noise-generating-condition satisfaction determining portion 120, to determine whether the engine speed Ne falls within the predetermined noise generating range (NE_THD≤Ne≤NE_THU) in which the noise is generated in the 4-wheel drive system 8. If an affirmative determination is obtained in the step S1, that is, if the engine speed Ne falls within the predetermined noise generating range, the control flow goes to a step S2. If a negative determination is obtained in the step S1, the control flow goes to a step S7. In the step S2 corresponding to the solenoid current controlling portion 122, the first solenoid coil 62 is energized with the initial small amount of electric current Ica. Then, the control flow goes to a step S3 corresponding to the speed rise determining portion 124, to determine whether the rotating speed Np is higher than the threshold value NP_THU. If an affirmative determination is obtained in the step S3, that is, if the rotating speed Np is equal to or higher than the threshold value NP_THU, the control flow goes to a step S4. If a negative determination is obtained in the step S3, the control flow goes back to the step S1.

In the step S4 which also corresponds to the solenoid current controlling portion 122 and which is implemented as a result of the affirmative determination in the step S3 that the rotating speed Np is equal to or higher than the threshold value NP_THU, the small amount of electric current Ic to be applied to the first solenoid coil 62 is feedback-controlled to lower the rotating speed Np according to the above-indicated Equation (1). Then, the control flow goes to a step S5 corresponding to the speed drop determining portion 126, to determine whether the rotating speed Np is lower than the threshold value NP_THD. If a negative determination is obtained in the step S5, that is, if the rotating speed Np is not lower than the threshold value NP_THD, the control flow goes back to the step S4. If an affirmative determination is obtained in the step S5, that is, if the rotating speed Np is lower than the threshold value NP_THD, the control flow goes to a step S6 also corresponding to the solenoid current controlling portion 122, to hold the small amount of electric current Ic at the present value for the predetermined length of time TH, and then reset the small amount of electric current Ic to the initial value Ica.

If a negative determination that the engine speed Ne does not fall within the predetermined noise generating range is obtained in the step S1, the control flow goes to the step S7 to determine whether a noise restraining control in the steps S2-S6 is being implemented. If a negative determination is obtained in the step S7, the control flow goes back to the step S1. If an affirmative determination that the noise restraining control is being implemented is obtained in the step S7, the control flow goes to a step S8 also corresponding to the solenoid current controlling portion 122, to de-energize the first solenoid coil 62.

Figure 6:
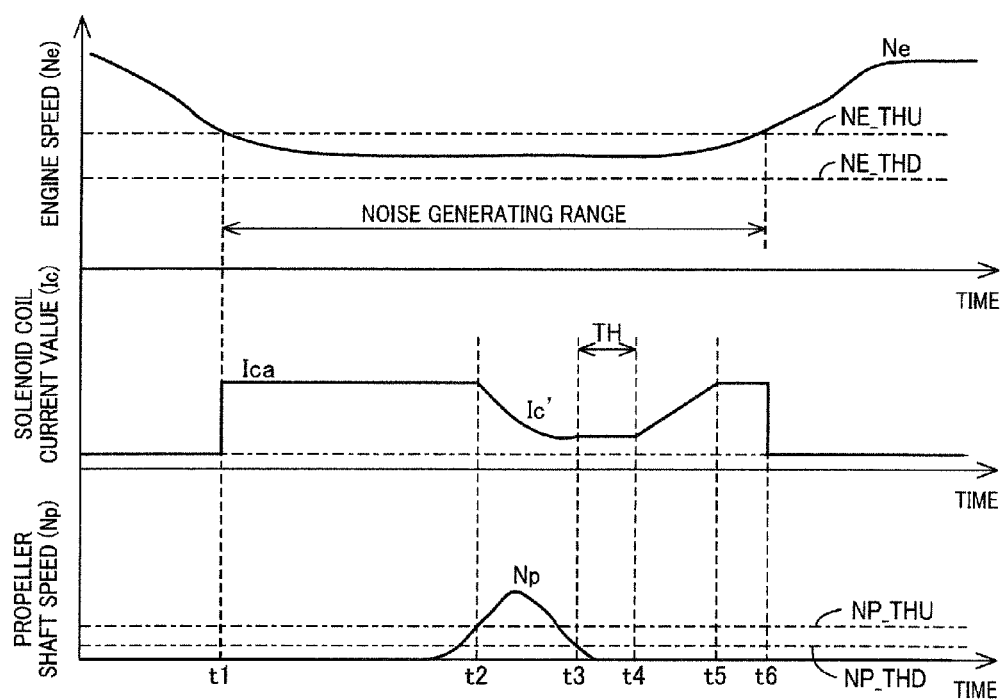
FIG. 6 is a time chart showing a result of the control operation of the electronic control device of FIG. 4.

FIG. 6 is the time chart showing a result of the control operation of the electronic control device 100. At a point of time t1 indicated in FIG. 6, the engine speed Ne falls within the predetermined noise generating range, so that the first solenoid coil 62 is energized with the initial small amount of electric current Ica. As a result, the first control clutch 60 is brought into a partially engaged or slipping state, and the first synchronizing mechanism 64 is operated so that the rotating speed Np of the propeller shaft 20 is raised from zero, whereby the backlashes existing in the spline-coupling portion 19 and any other portion of the drive line are eliminated. At a point of time t2, the rotating speed Np of the propeller shaft 20 reaches the predetermined threshold value NP_THU, so that the feedback control of the small amount of electric current Ic is initiated, that is, the small amount of electric current Ic is lowered, to lower the rotating speed Np. Accordingly, a rise of the rotating speed Np is stopped, and a drop of the rotating speed Np is initiated. After the rotating speed Np is lowered to the predetermined threshold value NP_THD at a point of time t3, the small amount of electric current Ic is held for the predetermined length of time TH at the present value Ic'. At a point of time t4, a gradual increase of the small amount of electric current Ic back to the initial value Ica is initiated. After the small amount of electric current Ic is increased back to the initial value Ica at a point of time t5, the small amount of electric current Ic is held at the initial value Ica. When the engine speed Ne is raised to the upper limit NE_THU of the noise generating range at a point of time t6, the first solenoid coil 62 is de-energized.

As described above, the control apparatus in the form of the electronic control device 100 according to the present embodiment of the invention is configured to bring the first clutch 28 (first control clutch 60) into the partially engaged or slipping state in the 2-wheel drive mode in which the first clutch 28 and the second clutch 36 are placed in the fully released states, so that the propeller shaft 20 is prevented from being rotated at a high speed as established in the fully engaged state of the first clutch 28, and the backlashes existing in the spline-coupling portion 19 and meshing gears in the drive line are eliminated. Thus, the present embodiment permits reduction of the noise generated in the 2-wheel drive mode of the vehicular 4-wheel drive system 8, while reducing deterioration of the fuel economy of the vehicular 4-wheel drive system 8.

The present electronic control device 100 is further configured to control the amount of electric current Ic to be applied to the first solenoid coil 62 on the basis of the rotating speed Np of the propeller shaft 20, such that the first clutch 28 (first control clutch 60) is placed in a partially engaged state or a slipping state, so that the deterioration of the fuel economy of the vehicular 4-wheel drive system 8 due to an unnecessary dragging rotary motion of the propeller shaft 20 can be effectively reduced.

The present electronic control device 100 is also configured to perform the above-described control operation when the engine speed Ne falls within the predetermined noise generating range (NE_THD≤Ne≤NE_THU), so that the generation of the noise due to the torque variation of the engine 10 can be effectively reduced. Namely, the control operation is not unnecessarily performed while the engine speed Ne is not held within the noise generating range, so that the deterioration of the fuel economy of the 4-wheel drive system 8 can be effectively reduced.

Another embodiment of this invention will be described. In the following embodiment, the same reference signs as used in the preceding embodiment will be used to identify the corresponding elements, which will not be described redundantly.

Second Embodiment

Figure 7:
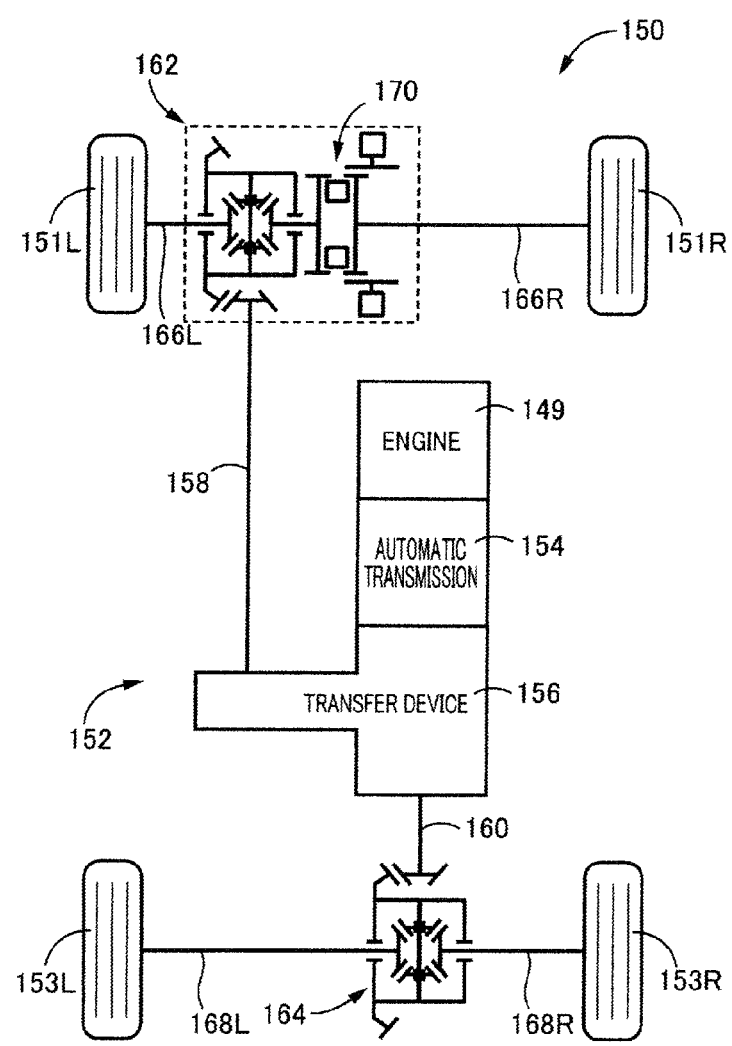
FIG. 7 is a schematic view showing an arrangement of another example of the vehicular 4-wheel drive system to which the control apparatus according to the invention is applicable.

FIG. 7 is the schematic view showing an arrangement of another example of a vehicular 4-wheel drive system to which the control apparatus according to the invention is applicable. As shown in FIG. 7, the present vehicular 4-wheel drive system 150 (hereinafter referred to simply as "4-wheel drive system 150") includes: a drive power source in the form of an engine 149; left and right front wheels 151L and 151R (hereinafter collectively referred to as "front wheels 151", unless otherwise specified); left and right rear wheels 153L and 153R (hereinafter collectively referred to as "rear wheels 153", unless otherwise specified); and a power transmitting device 152 which transmits a drive force of the engine 149 to the front wheels 151 and the rear wheels 153. The rear wheels 153 are primary drive wheels driven by the drive force in both of a 2-wheel drive mode and a 4-wheel drive mode of the 4-wheel drive system 150, while the front wheels 151 are auxiliary drive wheels not driven by the drive force in the 2-wheel drive mode and driven by the drive force in the 4-wheel drive mode. Thus, the 4-wheel drive system 150 is configured to drive a vehicle which is an FR type (front-engine rear-drive type) vehicle in the 2-wheel drive mode.

The power transmitting device 152 includes: an automatic transmission 154 connected to the engine 149; a power distributing device in the form of a transfer device 156 connected to the automatic transmission 154; a front propeller shaft 158 and a rear propeller shaft 160 both of which are connected to the transfer device 156; a front differential gear device 162 connected to the front propeller shaft 158; a rear differential gear device 164 connected to the rear propeller shaft 160; left and right front-wheel drive axles 166L and 166R (hereinafter referred to as "front-wheel drive axles 166", unless otherwise specified) connected to the front differential gear device 162; and left and right rear-wheel drive axles 168L and 168R (hereinafter referred to as "rear-wheel drive axles 168", unless otherwise specified) connected to the rear differential gear device 164. In the power transmitting device 152 constructed as described above, a drive force of the engine 149 received by the transfer device 156 through the automatic transmission 154 in the 2-wheel drive mode is transmitted to the rear wheels 153 through a rear-wheel-side power transmitting path provided with the rear propeller shaft 160, rear differential gear device 164 and rear-wheel drive axles 168. In the 4-wheel drive mode, a portion of the drive force of the engine 149 is transmitted to the front wheels 151 through a front-wheel-side power transmitting path provided with the front propeller shaft 158, front differential gear device 162 and front-wheel drive axles 166.

The front differential gear device 162 is provided with a front-side clutch 170 disposed on the side of the right front-wheel drive axle 166R, that is, between the front differential gear device 162 and the right front wheel 151R. The front-side clutch 170 is an electrically (electromagnetically) controlled dog clutch (positive or claw clutch) configured to selectively place a power transmitting path between the front differential gear device 162 and the right front wheel 151R, in a power transmitting state and a power cutoff state. The front-side clutch 170 may be provided with a synchronizing mechanism. The front-side clutch 170 functions as a second clutch provided in the vehicular 4-wheel drive system 150 to be controlled by the control apparatus according to the present invention.

Figure 8:
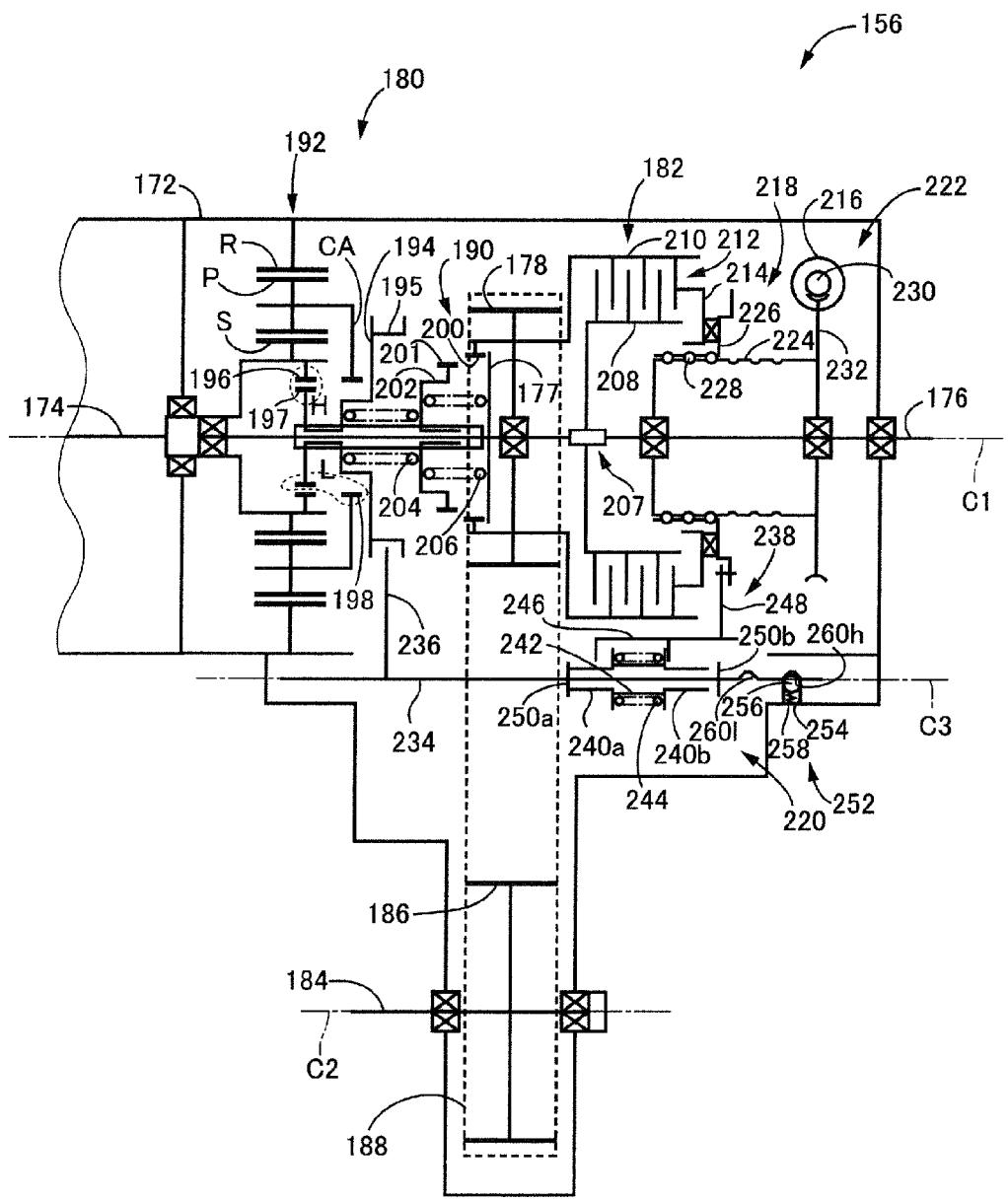
FIG. 8 is a schematic view showing a transfer device provided in the vehicular 4-wheel drive system of FIG. 7.

FIG. 8 is the schematic view showing the transfer device 156. As shown in FIG. 8, the transfer device 156 is provided with a stationary member in the form of a transfer casing 172. The transfer device 156 includes the following rotary members disposed within the transfer casing 172 such that the rotary members have a common axis C1 of rotation: an input rotary member in the form of an input shaft 174; a first output rotary member in the form of a rear-wheel side output shaft 176 from which a drive force is transmitted to a first pair of left and right wheels in the form of the rear wheels 153; a second output rotary member in the form of a drive gear 178 from which the drive force is transmitted to a second pair of left and right wheels in the form of the front wheels 151; an auxiliary transmission in the form of a high/low switching mechanism 180 configured to change a speed of a rotary motion of the input shaft 174 and transmit the rotary motion of the changed speed to the rear-wheel side output shaft 176; and a front-wheel drive clutch 182 which is a multiple-disc clutch to adjust a torque to be transmitted from the rear-wheel side output shaft 176 to the drive gear 178. The transfer device 156 further includes the following rotary members disposed with the transfer casing 172 such that the rotary members have a common axis C2 of rotation: a front-wheel side output shaft 184; and a driven gear 186 integrally fitted on the front-wheel side output shaft 184. The transfer device 156 further includes a front-wheel drive chain 188 connecting the drive gear 178 and the driven gear 186, and a differential locking mechanism 190 which is a dog clutch for integrally connecting the rear-wheel side output shaft 176 and the drive gear 178 to each other. The front-wheel drive clutch 182 functions as a first clutch.

The input shaft 174 is connected to an output rotary member (not shown) of the automatic transmission 154 through a spline-coupling or any other coupling member, such that the input shaft 174 is rotated with a drive force (torque) of the engine 149 received through the automatic transmission 154. The rear-wheel side output shaft 176 is a primary drive shaft connected to the rear propeller shaft 160. The drive gear 178 is disposed rotatably about an axis of the rear-wheel side output shaft 176. The front-wheel side output shaft 184 is an auxiliary drive shaft connected to the front propeller shaft 158.

The transfer device 156 constructed as described above is configured to adjust a torque (drive force) to be transmitted from the automatic transmission 154 to the drive gear 178, and to distribute the adjusted torque or drive force to only the rear wheels 153 or both of the front wheels 151 and the rear wheels 153. The transfer device 156 is further configured to be selectively placed in a differential state in which a differential rotary motion between the rear propeller shaft 160 and the front propeller shaft 158 is not limited, and a non-differential state (so-called a center-differential-locking state) in which the differential rotary motion is limited. The transfer device 156 is further configured to be placed in a high-gear position (high-speed position) H or a low-gear position (low-speed position) L, so that the speed of the rotary motion to be transmitted to the rear wheels 153 or the rear and front wheels 153 and 151 can be changed. Namely, the transfer device 156 is configured to transmit the rotary motion of the input shaft 174 to the rear-wheel side output shaft 176 through the high/low switching mechanism 180, and such that the drive force is not transmitted from the rear-wheel side output shaft 176 to the front-wheel side output shaft 184 when the torque to be transmitted through the front-wheel drive clutch 182 is zeroed while the differential locking mechanism 190 is placed in a released state, but is transmitted from the rear-wheel side output shaft 176 to the front-wheel side output shaft 184 through the drive gear 178, the front-wheel drive chain 188 and the driven gear 186 when the torque is transmitted through the front-wheel drive clutch 182 or when the differential locking mechanism 190 is placed in an engaged state.

Described more specifically, the high/low switching mechanism 180 is provided with a planetary gear set 192 of a single-pinion type, and a high/low switching sleeve 194. The planetary gear set 192 has: a sun gear S connected to the input shaft 174 such that the sun gear S is rotatable about the axis C1 together with the input shaft 174; a ring gear R disposed substantially coaxially with the sun gear S fixed to the transfer casing 172 such that the sun gear S is not rotatable about the axis C1; and a carrier CA supporting a plurality of pinion gears P meshing with the sun gear S and the ring gear R, such that each of the pinion gears P is rotatable about its axis and about an axis of the sun gear S. In this arrangement, the sun gear S is rotated at the same speed as the input shaft 174, and the carrier CA is rotated at a speed lower than that of the input shaft 174. The sun gear S has high-side gear teeth 196 fixedly formed on its inner circumferential surface, while the carrier CA has low-side gear teeth 198 fixedly formed thereon, which has the same diameter as the high-side gear teeth 196.

The high-side gear teeth 196 are spline teeth for establishing the high-gear position H for providing an output rotary motion at the same speed as that of the input shaft 174, while the low-side gear teeth 198 are spline teeth for establishing the low-gear position L for providing an output rotary motion at a speed lower than that in the high-gear position H. The high/low switching sleeve 194 is spline-coupled to the rear-wheel side output shaft 176 such that the high/low switching sleeve 194 is movable relative to the rear-wheel side output shaft 176 along the axis C1. The high/low switching sleeve 194 has a fork connecting portion 195, and external teeth 197 integrally formed adjacent to the fork connecting portion 195. When the high/low switching sleeve 194 is moved in respective opposite axial directions of the rear-wheel side output shaft 176 along the axis C1, the external teeth 197 are engageable selectively with the high-side gear teeth 196 and the low-side gear teeth 198. When the external teeth 197 are held in meshing engagement with the high-side gear teeth 196, a rotary motion at the same speed as that of the input shaft 174 is transmitted to the rear-wheel side output shaft 176. When the external teeth 197 are held in meshing engagement with the low-side gear teeth 198, a rotary motion at a speed lower than that of the input shaft 174 is transmitted to the rear-wheel side output shaft 176. The high-side gear teeth 196 and the high/low switching sleeve 194 cooperate to function as a high-gear position clutch for achieving a high-gear position H, while the low-side gear teeth 198 and the high/low switching sleeve 194 cooperate to function as a low-gear position clutch for achieving a low-gear position L. When the high/low switching sleeve 194 is not held in meshing engagement with either of the high-side gear teeth 196 and the low-side gear teeth 198, the high/low switching mechanism 180 is placed in a power cutoff state (neutral state). The transfer device 156 is switched to the high-gear position H or the low-gear position L after the high/low switching mechanism 180 is once placed in the power cutoff state.

The differential locking mechanism 190 has locking teeth 200 fixedly formed on an inner circumferential surface of the drive gear 178, and a locking sleeve 202 which is spline-coupled to the rear-wheel side output shaft 176 such that the locking sleeve 202 is movable relative to the rear-wheel side output shaft 176 along the axis C1, and which has external teeth 201 fixedly formed on its outer circumferential surface. The external teeth 201 are engageable with the locking teeth 200 when the locking sleeve 202 is moved along the axis C1. When the differential locking mechanism 190 is placed in an engaged state in which the locking teeth 200 and the external teeth 201 of the locking sleeve 202 are held in meshing engagement with each other, the transfer device 156 is placed in the center-differential-locking state in which the rear-wheel side output shaft 176 and the drive gear 178 are rotated as a unit.

The high/low switching sleeve 194 is disposed in a space on one side of the planetary gear set 192 on the side of the drive gear 178. The locking sleeve 202 is disposed in a space between the high/low switching mechanism 180 and the drive gear 178, adjacent to and independently of the high/low switching sleeve 194. The transfer device 156 is provided with a first spring 204 disposed between and held in abutting contact with the high/low switching sleeve 194 and the locking sleeve 202, to bias these sleeves 194 and 202 in the opposite directions away from each other. The transfer device 156 is further provided with a second spring 206 disposed between the drive gear 178 and the locking sleeve 202 and held in abutting contact with a projecting portion 177 of the rear-wheel side output shaft 176 and the locking sleeve 202, to bias the locking sleeve 202 in the direction away from the locking teeth 200. The projecting portion 177 is a radial flange projecting radially outwardly from the rear-wheel side output shaft 176 toward the locking teeth 200, in a space provided radially inwardly of the drive gear 178. The high-side gear teeth 196 are located on an opposite side of the locking sleeve 202 with respect to the low-side gear teeth 198 in the direction of the axis C1. The external teeth 197 of the high/low switching sleeve 194 are brought into meshing engagement with the high-side gear teeth 196 when the high/low switching sleeve 194 is moved in the direction away from the locking sleeve 202 (in the left direction as seen in FIG. 8), and with the low-side gear teeth 198 when the high/low switching sleeve 194 is moved in the direction toward the locking sleeve 202 (in the right direction as seen in FIG. 8). The external teeth 201 of the locking sleeve 202 are brought into meshing engagement with the locking teeth 200 when the locking sleeve 202 is moved in the direction toward the drive gear 178 (in the right direction as seen in FIG. 8). Namely, the external teeth 201 of the locking sleeve 202 are held in meshing engagement with the locking teeth 200 when the external teeth 197 of the high/low switching sleeve 194 are held in meshing engagement with the low-side gear teeth 198.

The front-wheel drive clutch 182 is a multiple-disc clutch including: a clutch hub 208 connected to the rear-wheel side output shaft 176 through a spline-coupling portion 207 such that the clutch hub 208 is rotatable together with the rear-wheel side output shaft 176; a clutch drum 210 connected to the drive gear 178 such that the clutch drum 210 is rotatable together with the drive gear 178; frictional coupling elements 212 interposed between the clutch hub 208 and the clutch drum 210, to selectively connect and disconnect to and from each other; and a piston 214 movable to force the frictional coupling elements 212 against each other. The front-wheel drive clutch 182 is disposed radially outwardly of the rear-wheel side output shaft 176 and at an opposite side of the high/low switching mechanism 180 with respect to the drive gear 178, and the frictional coupling elements 212 are forced against each other by the piston 214 when the piston 214 is moved toward the drive gear 178, that is, toward a fully advanced position in the direction of the axis C1. The front-wheel drive clutch 182 is placed in a fully released state when the piston 214 is located at a fully retracted position which is spaced apart from the fully advanced position away from the drive gear 178 in the direction of the axis C1 (in the right direction as seen in FIG. 8). In the fully released state, the frictional coupling elements 212 are not held in abutting contact with each other. On the other hand, the front-wheel drive clutch 182 is brought into a partially engaged or slipping state or a fully engaged state when the piston 214 is moved toward the drive gear 178 or to the fully advanced position in the direction of the axis C1 (in the left direction as seen in FIG. 8). In the fully engaged state, the frictional coupling elements 212 are held in tight abutting contact with each other. In the partially engaged or slipping state, the frictional coupling elements 212 are held in loose abutting contact with each other. The torque to be transmitted through the front-wheel drive clutch 182 is adjusted according to a degree of mutual abutting contact of the frictional coupling elements 212, namely, according to a distance of axial movement of the piston 214 toward the fully advanced position.

In the transfer device 156, a power transmitting path between the rear-wheel side output shaft 176 and the drive gear 178 is placed in a power cutoff state when the front-wheel drive clutch 182 is placed in the fully released state while the differential locking mechanism 190 is placed in the released state in which the external teeth 201 of the locking sleeve 202 and the locking teeth 200 are not held in meshing engagement with each other. In the power cutoff state, the drive force is transmitted from the automatic transmission 154 to only the rear wheels 153. In the slipping or fully engaged state of the front-wheel drive clutch 182, the drive force received by the transfer device 154 from the automatic transmission 154 is distributed to the front wheels 151 and the rear wheels 153. In the slipping state of the front-wheel drive clutch 182, the transfer device 156 is placed in the differential state (non-center-differential locking state) permitting a difference between the rotating speeds of the rear-wheel side output shaft 176 and the drive gear 178. In the fully engaged state of the front-wheel drive clutch 182, the transfer device 156 is placed in the center-differential-locking state in which the rear-wheel side output shaft 176 and the drive gear 178 are rotated as a unit. The torque to be transmitted through the front-wheel drive clutch 182 is continuously variable to change a proportion of the torques to be transmitted to the front wheels 151 and the rear wheels 153, within a range between 0:100 and 50:50, for example.

To actuate the high/low switching mechanism 180, the front-wheel drive clutch 182 and the differential locking mechanism 190, the transfer device 156 further includes: an electric motor 216; a screw mechanism 218 configured to convert a rotary motion of the electric motor 216 into a linear motion; and a power transmitting mechanism 220 configured to transmit the linear motion of the screw mechanism 218 to the high/low switching mechanism 180, the front-wheel drive clutch 182 and the differential locking mechanism 190.

The screw mechanism 218 is disposed coaxially with the rear-wheel side output shaft 176, and includes a rotary member in the form of a screw shaft member 224 connected to the electric motor 216 through a worm gear 222, and a linear motion member in the form of a nut member 226 connected to the screw shaft member 224 such that the nut member 226 is movable in the direction of the axis C1 as the screw shaft member 224 is rotated. The screw mechanism 218 is a ball screw device in which the screw shaft member 224 and the nut member 226 are held in engagement with each other through a multiplicity of balls 228. The worm gear 222 is a pair of gears consisting of a worm 230 formed integrally with an output shaft of the electric motor 216, and a worm wheel 232 formed integrally with the screw shaft member 224 and coaxially with the rear-wheel side output shaft 176. A rotary motion of the electric motor 216, which is a brushless motor, for instance, is transmitted to the screw shaft member 224 through the worm gear 222 such that a rotating speed of the screw shaft member 224 is reduced with respect to the output shaft of the electric motor 216. The screw mechanism 218 converts a rotary motion of the screw shaft member 224 into a linear motion of the nut member 226.

The power transmitting mechanism 220 includes: a fork shaft 234 which is disposed on an axis C3 parallel to the axis C1 of the screw shaft member 224 and which is connected to the nut member 226; and a fork 236 fixed to the fork shaft 234 and connected to the high/low switching sleeve 194. The power transmitting mechanism 220 is configured to transmit the linear motion of the nut member 226 of the screw mechanism 218 to the high/low switching sleeve 194 of the high/low switching mechanism 180 through the fork shaft 234 and the fork 236. The high/low switching sleeve 194 and the locking sleeve 202 receive a thrust force from each other through the first spring 204, while the locking sleeve 202 receives a thrust force from the projecting portion 177 of the rear-wheel side output shaft 176 through the second spring 206. Accordingly, the power transmitting mechanism 220 transmits a force of the linear motion of the nut member 226 of the screw mechanism 218 to the locking sleeve 202 of the differential locking mechanism 190 through the high/low switching sleeve 194. Thus, the first spring 204 and the second spring 206 constitute a portion of the power transmitting mechanism 220.

The screw mechanism 218 is disposed on one side of the front-wheel drive clutch 182 remote from the drive gear 178. The piston 214 of the front-wheel drive clutch 182 is connected to the nut member 226 of the screw mechanism 218 such that the piston 214 is movable together with the nut member 226 in the direction of the axis C1 and rotatable relative to the nut member 226 about the axis C1. Accordingly, the force of the linear motion of the nut member 226 of the screw mechanism 218 is transmitted to the frictional coupling elements 212 of the front-wheel drive clutch 182 through the piston 214. Thus, the piston 214 functions as a pressing member which is connected to the nut member 226 and movable to force the frictional coupling elements 212 of the front-wheel drive clutch 182 against each other. The piston 214 constitutes a portion of the power transmitting mechanism 220. As described above, the power transmitting mechanism 220 transmits the force of the linear motion of the nut member 226 of the screw mechanism 218 to the frictional coupling elements 212 of the front-wheel drive clutch 182.

The power transmitting mechanism 220 is provided with a connecting mechanism 238 connecting the nut member 226 and the fork shaft 234 to each other. The connecting mechanism 238 includes: two flanged cylindrical members 240a and 240b which are disposed on the axis C3 slidably on the fork shaft 234 in the direction of the axis C3, and which have respective radial flanges formed at their axial ends such that the radial flanges are opposed to each other; a cylindrical spacer 242 interposed between the two flanged cylindrical members 240a and 240b; a third spring 244 disposed radially outwardly of the spacer 242; a presser member 246 for pressing the two flanged cylindrical members 240a and 240b such that the flanged cylindrical members 240a and 240b are slidable in the direction of the axis C3; and a connecting member 248 connecting the presser member 246 and the nut member 226 to each other. The presser member 246 is abuttable onto the radial flanges of the flanged cylindrical members 240a and 240b to slidably move these cylindrical members 240a and 240b on the fork shaft 234. A distance between the two radial flanges when the presser member 246 is held in abutting contact with both of the two radial flanges is larger than an axial length of the spacer 242. Namely, both of the two radial flanges are held in abutting contact with the presser member 246 under a biasing action of the third spring 244.

The fork shaft 234 is provided on its outer circumferential surface with stoppers 250a and 250b for preventing the flanged cylindrical members 240a and 240b from slidably moving in the direction of the axis C3, so that the power transmitting mechanism 220 permits the linear motion of the nut member 226 to be transmitted to the high/low switching mechanism 180 through the fork shaft 234 and the fork 236.

The external teeth 201 of the locking sleeve 202 are placed in meshing engagement with the locking teeth 200 when the fork shaft 234 is located at a position (low-gear position) at which the external teeth 197 of the high/low switching sleeve 194 are held in meshing engagement with the low-side gear teeth 198. The frictional coupling elements 212 of the front-wheel drive clutch 182 are forced against each other by the piston 214 when the fork shaft 234 is located at a position (high-gear position) at which the external teeth 197 of the high/low switching sleeve 194 are held in meshing engagement with the high-side gear teeth 196. The frictional coupling elements 212 are not forced against each other by the piston 214 when the fork shaft 234 is located at the low-gear position.

In the high-gear position of the fork shaft 234, the distance between the two radial flanges of the flanged cylindrical members 240a and 240b is adjustable between the value when the presser member 246 is held in abutting contact with both of the two radial flanges, and the axial length of the spacer 242. Accordingly, the connecting mechanism 238 permits a movement of the nut member 226 in the direction of the axis C1, between the position at which the frictional coupling elements 212 of the front-wheel drive clutch 182 are forced against each other by the piston 214, and the position at which the frictional coupling elements 212 are not forced against each other by the piston 214, while the fork shaft 234 is kept in the high-gear position.

The transfer device 156 further includes a gear position retainer mechanism 252 configured to hold the fork shaft 234 at the high-gear position and the low-gear position. The gear position retainer mechanism 252 has: an accommodating hole 254 formed through an inner circumferential surface of the transfer casing 172 on which the fork shaft 234 is slidably movable; a locking ball 256 accommodated in the accommodating hole 254; a locking spring 258 biasing the locking ball 256 toward the fork shaft 234; and a recess 260h and a recess 260l which are formed in the outer circumferential surface of the fork shaft 234 and which receive a portion of the locking ball 256 when the fork shaft 234 is located at the respective high-gear and low-gear positions. The fork shaft 234 can be kept at the high-gear and low-gear positions by the gear position retainer mechanism 252, even after the electric motor 216 is turned off.

In the transfer device 156 constructed as described above, the power transmitting path between the rear-wheel side output shaft 176 and the drive gear 178 is placed in the power cutoff state while the front-wheel drive clutch 182 is placed in the fully released state and while the differential locking mechanism 190 is placed in the released state in which the external teeth 201 of the locking sleeve 202 are not held in meshing engagement with the locking teeth 200. In this power cutoff state, the 4-wheel drive system 150 is placed in the 2-wheel drive mode in which the drive force received from the automatic transmission 154 is transmitted to only the rear wheels 153. When the front-side clutch 170 is placed in the fully released state in the above-indicated power cutoff state, amounts of dragging rotary motions of the rotary members provided in a power transmitting path between the front-wheel drive clutch 182 and the front-side clutch 170 are reduced. Those rotary members include the drive gear 178, the driven gear 186, the front-wheel drive chain 188, the front propeller shaft 158 and the front differential gear device 162. A rotary motion variation (torque variation) of the engine 149 in the fully released state of the front-side clutch 170 causes generation of a rattling noise in the spline-coupling portion 207 between the rear-wheel side output shaft 176 and the clutch hub 208, due to mutual abutting contact of the spline teeth. In view of this phenomenon, the front-wheel drive clutch 182 which is adjustable of the torque to be transmitted therethrough is controlled to be brought into a partially engaged or slipping state, to eliminate the backlashes existing in the spline-coupling portion 207, for thereby reducing the generation of the rattling noise. The control operation of the front-wheel drive clutch 182 is similar to that of the first clutch 28 described in detail with respect to the first embodiment. The drive gear 178, driven gear 186, front-wheel drive chain 188 and front propeller shaft 158 provided in the power transmitting path between the front-wheel drive clutch 182 and the front-side clutch 170 are rotary members disposed between the first and second clutches to be controlled by the control apparatus according to the second embodiment of this invention.

As described above, the transfer device 156 provided in the 4-wheel drive system 150 configured to drive the FR type vehicle having the front wheels 151 as the auxiliary drive wheels and the rear wheels 153 as the primary drive wheels is provided with the front-wheel drive clutch 182 which is adjustable of the torque to be transmitted therethrough. Where the spline-coupling portion 207 is considered to generate the rattling noise in the 2-wheel drive mode of the 4-wheel drive system 150 in which the front-wheel drive clutch 182 and the front-side clutch 170 are placed in the fully released states, the front-wheel drive clutch 182 is brought into a partially engaged state to eliminate the backlashes existing in the spline-coupling portion 207, for reducing the generation of the rattling noise.

While the preferred embodiments of this invention have been described in detail by reference to the drawings, it is to be understood that the invention may be otherwise embodied.

In the first embodiment, the torque to be transmitted through the first control clutch 60 is adjustable according to an amount of electric current to be applied to the first solenoid coil 62. However, the first control clutch 60 may be replaced by any other type of clutch the torque capacity of which is adjustable, for example, a hydraulically operated clutch an engaging pressure of which is controlled by a solenoid valve.

In the first embodiment, the upper limit NP_THU of the rotating speed Np of the propeller shaft 20 is set to be a value below which substantially no deterioration of the fuel economy of the 4-wheel drive system 8 due to a dragging rotary motion of the propeller shaft 20 takes place. However, the upper limit NP_THU may be set at a value lower than the above-indicated value.

In the first embodiment, the small amount of electric current Ic to be applied to the first solenoid coil 62 is feedback-controlled after a moment of the determination that the rotating speed Np of the propeller shaft 20 has been raised to the upper limit NP_THU or larger. However, the small amount of electric current Ic need not be feedback-controlled, and may be otherwise controlled. For instance, the small amount of electric current Ic may be gradually reduced at a predetermined rate.

In the first embodiment, the 4-wheel drive system 8 is provided with the first coupling 30 and the second coupling 31 which are disposed on the rear-wheel drive axles 26L and 26R, to permit distribution of the drive force to the left and right rear wheels 14L and 14R. However, the 4-wheel drive system 8 may be modified. For example, a rear differential device may be provided for the rear wheels 14, while the propeller shaft 20 or one of the rear-wheel drive axles 26L and 26R is provided with one coupling. Further, the 4-wheel drive system 8 need not be provided with any coupling.

While each of the first clutch 28 and the second clutch 36 is a positive or claw clutch (dog clutch) in the first embodiment, at least one of these first and second clutches 28 and 36 may be a multiple-disc clutch.

In the illustrated first and second embodiments, the automatic transmission 16, 154 is an automatic transmission of a planetary gear type having a plurality of gear positions (shift positions), for example, four, five, six or more forward-drive positions, which are selectively established by selectively connecting rotary elements provided in a plurality of planetary gear sets by the engaging elements. However, the automatic transmission 16, 154 may be replaced by any other type of transmission such as: a transmission of a synchronous meshing parallel two-axes type wherein a plurality of pairs of gears each of which consists of two shift gears permanently held in meshing engagement with each other and mounted on respective two shafts, and which are selectively shifted by a shifting actuator to transmit a vehicle drive force under the control of a synchronizing device; a dual clutch type transmission (DCT) which is a synchronous meshing parallel two-axes type transmission having two input shafts which are provided with respective clutches and which are connected to respective drive lines corresponding to two sets of shift position, namely, even-numbered shift positions and odd-numbered shift positions; a belt-and-pulley type continuously variable transmission having a pair of pulleys which are connected to each other by a power transmitting member in the form of a transmission belt, and effective diameters of which are variable to continuously change the speed ratio; and a traction type continuously variable transmission having a pair of cones rotatable about a common axis, and a plurality of rollers which are rotatable about an axis intersecting the above-indicated common axis and which are squeezed between the pair of cones, and wherein an angle of intersection between the common axis of the cones and the axis of the rollers is variable to continuously change the speed ratio.

It is to be understood that the embodiments and modifications described above are given for illustrative purpose only, and that the present invention may be embodied with various other changes and improvements which may occur to those skilled in the art.

NOMENCLATURE OF REFERENCE SIGNS

8, 150: Vehicular 4-wheel drive system
10, 149: Engine (Drive power source)
11: Lock-up clutch
12: Front wheels (Primary drive wheels)
14: Rear Wheels (Auxiliary drive wheels)
15: Torque converter
16, 154: Automatic transmission (Transmission)
20: Propeller shaft (Rotary member)
28: First clutch
36: Second clutch
151: Front wheels (Auxiliary drive wheels)
153: Rear Wheels (Primary drive wheels)
158: Front propeller shaft (Rotary member)
170: Front-side clutch (Second clutch)
178: Drive gear (Rotary member)
182: Front-wheel drive clutch (First clutch)
186: Driven gear (Rotary member)
188: Front-wheel drive chain (Rotary member)

What is claimed is:

1. A control apparatus for a vehicular 4-wheel drive system provided with: primary drive wheels to which a drive force is transmitted from a drive power source; auxiliary drive wheels to which the drive force is selectively transmitted; a first clutch configured to selectively place a first power transmitting path between the drive power source and the auxiliary drive wheels, in a power transmitting state and a power cutoff state; and a second clutch disposed in a second power transmitting path between the first clutch and the auxiliary drive wheels, to selectively place the second power transmitting path in a power transmitting state and a power cutoff state, the control apparatus being configured to place said first clutch and said second clutch in fully released states in a 2-wheel drive mode of the vehicular 4-wheel drive system in which the drive force is transmitted from the drive power source to the primary drive wheels, the control apparatus comprising:
- a first-clutch control portion configured to bring said first clutch into a partially engaged state when a predetermined condition in which the vehicular 4-wheel drive system generates or is considered to generate a noise is satisfied in the 2-wheel drive mode in which said first and second clutches are placed in the fully released states.

2. The control apparatus according to claim 1, wherein the first-clutch control portion places the first clutch in the partially engaged state while the second clutch is held in the fully released state.

3. The control apparatus according to claim 1, wherein the first-clutch control portion controls the partially engaged state of the first clutch on the basis of rotating speed of two rotary members disposed on respective opposite sides of the first clutch.

4. The control apparatus according to claim 1, wherein said predetermined condition is satisfied when at least one of the following conditions is satisfied: an operating speed of the drive power source falls within a predetermined range; a load of the drive power source is equal to or larger than a predetermined value; a transmission operatively connected to the drive power source is presently placed in any one of at least one predetermined high-gear shift position; and a lock-up clutch provided in a torque converter disposed between the drive power source and the transmission is placed in a fully engaged state or a partially engaged state.

* * * * *